(12) United States Patent
Suga et al.

(10) Patent No.: US 7,706,530 B2
(45) Date of Patent: Apr. 27, 2010

(54) KEY INFORMATION PROCESSING METHOD, DEVICE THEREOF, AND PROGRAM

(75) Inventors: Yuji Suga, Kawasaki (JP); Junichi Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1143 days.

(21) Appl. No.: 11/329,037

(22) Filed: Jan. 11, 2006

(65) Prior Publication Data

US 2006/0149762 A1 Jul. 6, 2006

Related U.S. Application Data

(63) Continuation of application No. PCT/JP2004/009946, filed on Jul. 12, 2004.

(30) Foreign Application Priority Data

| Jul. 11, 2003 | (JP) | ............................. | 2003-195729 |
| Sep. 12, 2003 | (JP) | ............................. | 2003-321420 |
| Sep. 29, 2003 | (JP) | ............................. | 2003-338679 |

(51) Int. Cl.
*H04L 9/00* (2006.01)
(52) U.S. Cl. ........................................ 380/44; 380/277
(58) Field of Classification Search ......... 380/277–279, 380/44–45; 713/181, 189
See application file for complete search history.

(56) References Cited

U.S. PATENT DOCUMENTS 5,754,659 A * 5/1998 Sprunk et al. .................. 380/30

(Continued)

FOREIGN PATENT DOCUMENTS

JP 09-182050 7/1997

(Continued)

OTHER PUBLICATIONS

Sandhu R.S, "Cryptographic Implementation of a Tree Hierarchy for Access Control", Information Processing Letters, vol. 27, No. 2, pp. 95 to 98, Feb. 29, 1988.

(Continued)

*Primary Examiner*—Hosuk Song
(74) *Attorney, Agent, or Firm*—Fitzpatrick, Cella, Harper & Scinto

(57) ABSTRACT

It is possible to safely constitute a key management method having an access structure equivalent to the hierarchical key management method with a small amount of calculations. The method includes: a setting step for setting a set (,) of the number of times a one-way hash function is executed for each of the elements of the rank i; a key generation step for generating two separate keys for the elements as the value of the number of times the one-way function has been executed corresponding to the set of the number of times which has been set for the elements of the two original keys for each of the elements; and a key delivery step for delivering the two separate keys for the elements to each of the elements. Furthermore, the method includes an initial key generation step for calculating N keys with a route node positioned at the most significant node when generating a key at each node from a parent node and performing key delivery according to the hierarchical relationship expressed in a directed graph having no cycle; and a node key generation step for generating the value of the number of predetermined times the one-way function is executed according to the execution specification for M keys (M≦N) among the N initial keys in each node, as the M node keys for the node.

42 Claims, 30 Drawing Sheets

U.S. PATENT DOCUMENTS

| | | | |
|---|---|---|---|
| 5,796,839 A * | 8/1998 | Ishiguro | 380/44 |
| 2004/0081334 A1 | 4/2004 | Hayashi | |
| 2004/0174999 A1 | 9/2004 | Suga et al. | |

FOREIGN PATENT DOCUMENTS

| | | |
|---|---|---|
| JP | 11-98487 | 4/1999 |

OTHER PUBLICATIONS

Zheng Y., Hardjono T., and Pieprzyk J., "The Sibling Intractable Function Family (SIFF): Notion, Construction and Applications", IEICE Transactions Fundamentals of Electronics, Communications and Computer Science, vol. E76-A, No. 1, pp. 4-13, Jan. 25, 1993.

Katsutoshi Ando, Osamu Watanabe, Hitoshi Takaie, "JPEG2000 Fugoka Gazo no Joho Hankaijiho", The Transactions of the Institute of Electronics, Information and Communication Engineers, vol. J85-D-II, No. 2, pp. 282-290, Feb. 2002.

Katsutoshi Ando, Osamu Watanabe and Hitoshi Kiya, "Partial-Scrambling of Image Encoded by JPEG2000", The Transactions of the Institute of Electronics, Information and Communication Engineers, vol. J85-D-II, No. 2, pp. 282-290, Feb. 1, 2002.

C. H. Lin. "Dynamic key management schemes for access control in a hierarchy," Computer Communications, 20:1381-1385, 1997.

J.-C. Birget, X. Zou, G. Noubir, B. Ramamurthy, "Hierarchy-Based Access Control in Distributed Environments" in the Proceedings of IEEE ICC, Jun. 2001.

Marc Joye et al., "One-Way Cross-Trees and Their Applications", Lecture Notes in Computer Science, vol. 2274, 2002, pp. 346-356.

Toshihisa Nakano et al., "Key Management System for Digital Content Protection", SCIA 2001, Jan. 23-26, 2001, pp. 213-218 (with English Translation).

* cited by examiner 3A    3B 9A  9B

FIG. 13

| 3,6 | 2,5 | 1,4 | 0,0 |
|-----|-----|-----|-----|
| 4,6 | 4,5 | 4,4 | 4,1 |
| 5,6 | 5,5 | 5,4 | 5,2 |
| 6,6 | 6,5 | 6,4 | 6,3 |

13A

| N,N | 1,2 | 0,0 | 0,0 |
|-----|-----|-----|-----|
| N,N | 1,2 | 0,0 | 0,0 |
| N,N | 2,2 | 2,1 | 2,1 |
| N,N | N,N | N,N | N,N |

| 4,8 | 3,7 | 2,6 | 1,5 | 0,0 |
|-----|-----|-----|-----|-----|
| 5,8 | 5,7 | 5,6 | 5,5 | 5,1 |
| 6,8 | 6,7 | 6,6 | 6,5 | 6,2 |
| 7,8 | 7,7 | 7,6 | 7,5 | 7,3 |
| 8,8 | 8,7 | 8,6 | 8,5 | 8,4 |

14A

| N,N | 2,4 | 1,3 | 0,0 | 0,0 |
|-----|-----|-----|-----|-----|
| N,N | 2,4 | 1,3 | 0,0 | 0,0 |
| N,N | 3,4 | 3,3 | 3,1 | 3,1 |
| N,N | 4,4 | 4,3 | 4,2 | 4,2 |
| N,N | N,N | N,N | N,N | N,N |

14B

| N | 0 | 0 |
|---|---|---|
| N | 0 | 0 |
| N | N | N |

| 2,5 | 1,4 | 0,0 |
|---|---|---|
| 5,5 | 4,4 | 3,1 |
| 6,5 | 6,4 | 6,2 |
| 7,5 | 7,4 | 7,3 |

~20A

| N | 0 | 0 |
|---|---|---|
| N | 0 | 0 |
| N | 1 | 1 |
| N | N | N |

~20B

| [0,N,N] | [0,0,N] | [0,0,0] |
| --- | --- | --- |
| [1,N,N] | [1,1,N] | [1,1,1] |
| [2,N,N] | [2,2,N] | [2,2,2] |

FIG. 26

| 0,-,- | -,0,- | -,-,0 |
|---|---|---|
| 1,-,- | -,1,- | -,-,1 |
| 2,-,- | -,2,- | -,-,2 |

FIG. 27

| 0,N,N | -,0,N | -,-,0 |
|---|---|---|
| 1,N,N | -,1,N | -,-,1 |
| 2,N,N | -,2,N | -,-,2 |

FIG. 28

| 0,N,N | 0,0,N | 0,-,0 |
|---|---|---|
| 1,N,N | 1,1,N | 1,-,1 |
| 2,N,N | 2,2,N | 2,-,2 |

| 1,N,N | 0,0,N | 0,0,0 |
|---|---|---|
| 2,N,N | 2,0,N | 2,0,1 |
| 3,N,N | 3,1,N | 3,1,2 |

F I G. 32
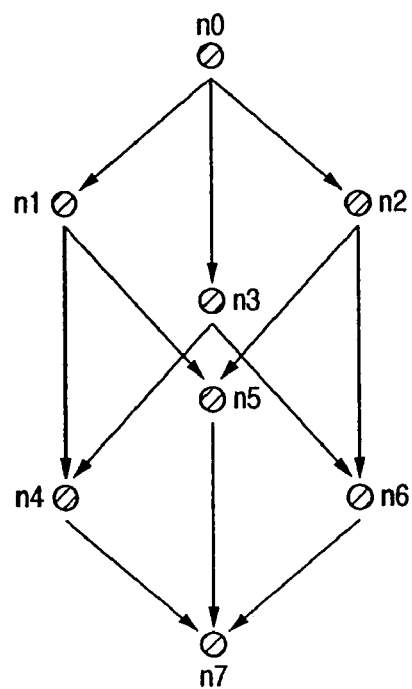
F I G. 33
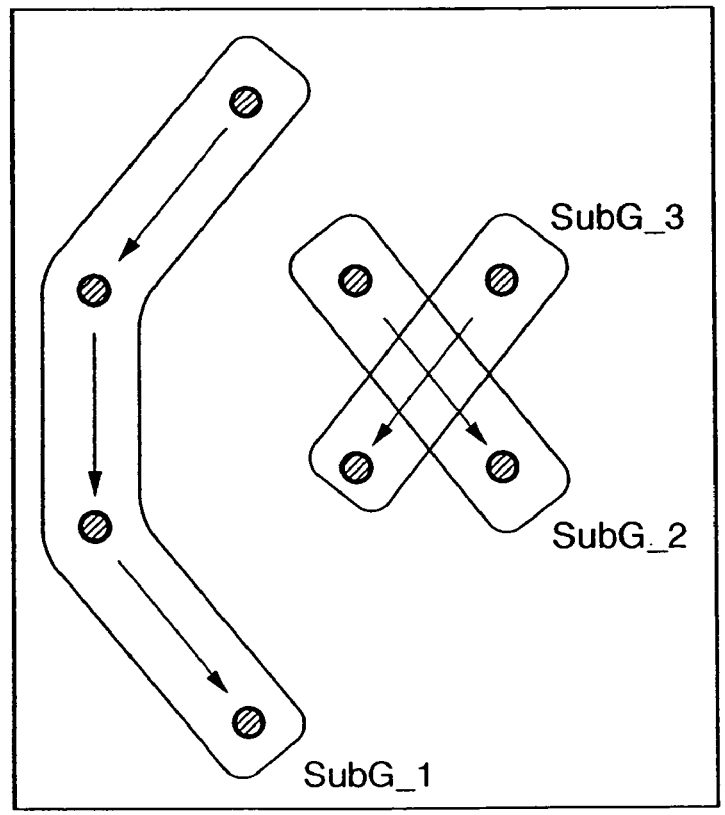

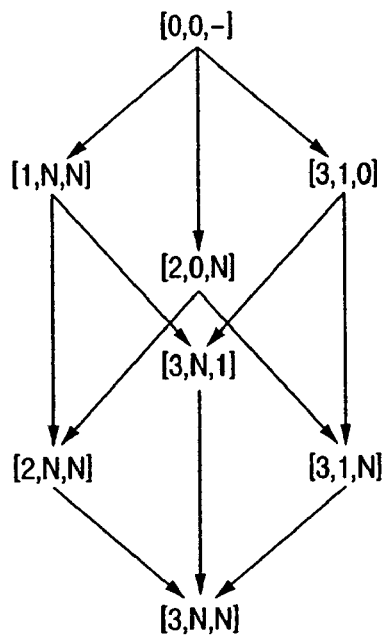
F I G. 38
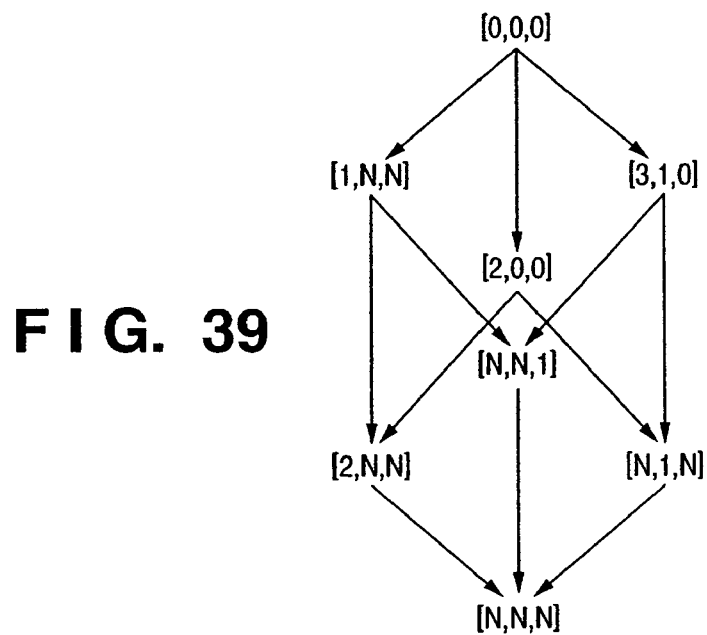
F I G. 39
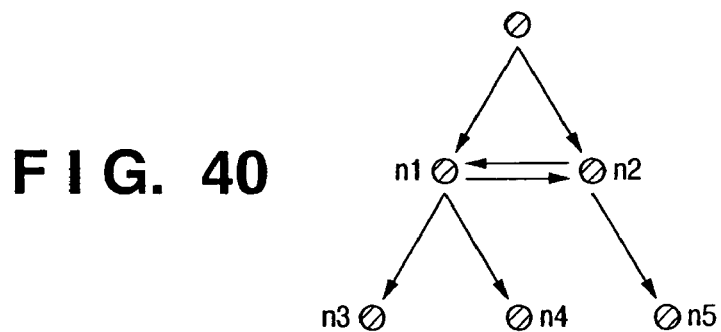
F I G. 40

FIG. 43

| | HIGH RESOLUTION | MEDIUM RESOLUTION | LOW RESOLUTION |
|---|---|---|---|
| AREA B | IMG_1(H) | IMG_1(M) | IMG_1(L) |
| AREA A | IMG_2(H) | IMG_2(M) | IMG_2(L) |
| ALL AREAS | IMG_3(H) | IMG_3(M) | IMG_3(L) |

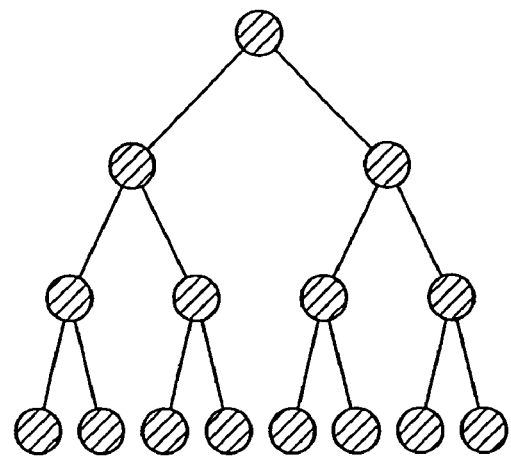
F I G. 44
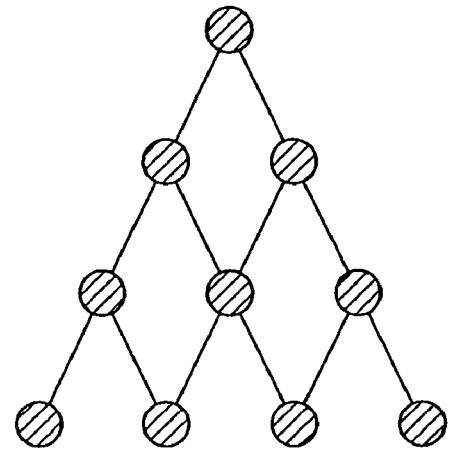
F I G. 45
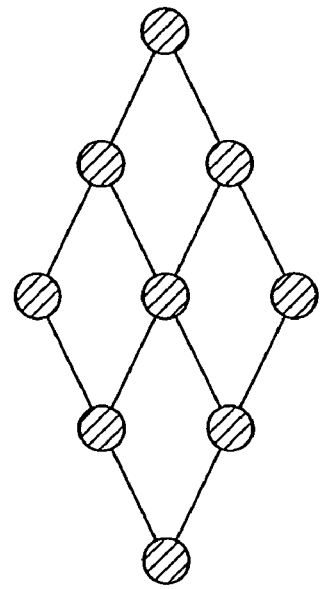
F I G. 46

KEY INFORMATION PROCESSING METHOD, DEVICE THEREOF, AND PROGRAM

CLAIM OF PRIORITY

This application is based upon and claims the benefit of priority from the prior Japanese Patent Application No. 2003-195729 filed on Jul. 11, 2003, Japanese Patent Application No. 2003-321420 filed on Sep. 12, 2003, and Japanese Patent Application No. 2003-338679 filed on Sep. 29, 2003, the entire contents of which are incorporated herein by reference.

TECHNICAL FIELD

The present invention relates to a key information processing method, a device thereof, and a program, and more specifically to a key information processing method, a device thereof, and a program for preferably reducing the load relating to the amount of calculation required in generating a key, and the number of key deliveries in the contents delivery system and the removal media control method requiring management of plural keys for decoding.

BACKGROUND ART

Recently, there has been an increasing number of opportunities for digital contents such as a document, image data, etc. to be distributed through large-capacity recording media such as a communication line, a DVD, etc. A digital contents delivery service distributes contents to specific users, and requires a system not to reveal the contents to other people than the specific users. In the delivery of contents through large-capacity media, a mechanism for similarly controlling access by users has been developed. In this case, contents data has been encrypted, scrambled, etc., and there has been provided a system in which only authorized users informed of valid key information or de-scrambling process can perform a decoding process and legally use the contents such as the documents, image data, etc.

In the contents delivery service, there is a contents provider for distributing the contents. It is necessary for the contents provider to set different pieces of access control information for the respective contents, and it is assumed that an encrypting process is to be performed using a different key for each content, user, and user action (for example, browsing, copying, etc.). In this process, the management of the key information about key generation, key holding, key delivery, etc. puts a heavy load on a contents provider in many cases. Therefore, relating to the key management, there has been a study on the way to efficiently manage a key without degrading the security level. Described below are some conventional managing methods.

[Tree Structure Management Method]

The tree structure management method is used by contents regeneration equipment in an off-line mode of a DVD player, etc., and is suitable for performing nullification of users. In this method, the key information and encrypted contents used in the encrypting process are simultaneously delivered or stored in a medium so that only an authorized user can decode the encrypted data. Although it is necessary to deliver key information in advance using an appropriate combination for each user, the tree structure allows an enormously large amount of user key information to be efficiently managed.

In the management method, there are the following indices for determining a method is good or bad. They are: 1) data size of the key information delivered with contents; 2) data size of the key information delivered in advance and held by a user; and 3) data size of the key information to be managed by a contents provider. In the case of the online delivery service, the index 1) on which the network traffic depends is regarded. However, from the viewpoint of the contents provider, the management cost of the index 3) is regarded with the highest priority. Thus, it is important to consider the change in weight of the index depending on the situation.

A typical tree structure management method is a contents delivery model (for example, refer to the Non-Patent Document 1). This model uses a tree structure for key delivery as shown in FIG. 44, and a different key is assigned to each node. A user key (a key held by a player such as a DVD in the document) is identified as a terminal node (leaf node), and it is assumed that all key data from the root to the terminal node are held. In this model, it is assumed that data is frequently updated, and the efficiency of nullifying a key can be improved with the above-mentioned configuration.

[Hierarchical Key Management Method]

On the other hand, the key management assumed in the hierarchical key management method is identical in assigning a key to each node, but it is greatly different in that keys assigned to all nodes including the root, not only a terminal node, are delivered to the user (for example, refer to the Non-Patent Documents 2 and 3).

Unlike the n-ary tree as shown in FIG. 44, an access structure as shown in FIGS. 45 and 46 is assumed, and there is a portion where the relationship as shown in FIG. 47 is locally detected. In this case, it is necessary to provide a system capable of generating a key to be held by a node n3 from both key assigned to a node n1 and key assigned to a node n2. According to the document of Birget et al. (Non-Patent Document 3), the methods for providing the system can be the following two methods proposed.

[(1) User Multiple Keying]

Each node holds plural keys, and a parent node is designed to have all keys of a child node. FIG. 48 shows an example, and shows a set of key data delivered to each node. For example, the parent node of a node to which {k5} is delivered includes the key data k5. Similarly, in other nodes, a parent node includes all key data of its child node.

[(2) One-way Function Based Keying Schemes]

A method obtained by extending the proposition (Non-Patent Document 2) of Lin et al., and the key information held by each node can be reduced using a one-way hash function. However, when the key data of a child node is generated from the key data of plural parent nodes as shown in FIG. 47, the following operations are required. The operations are explained below by referring to FIG. 49.

In FIG. 49, to generate key data k3 from key data k1 or k2, the following arithmetic operations are performed.

$$k3 := F(k1, n3) \, XOR \, r13$$

$$k3 := F(k2, n3) \, XOR \, r23$$

where "XOR" indicates an exclusive OR for each bit, and "F( )" indicates a one-way hash function and is described later in detail. "n3" indicates an identifier of a node associated with the key data k3, "r13" and "r23" respectively indicate the random data associated with the node n1 (key data k1) and the node n3, and the random data associated with the node n2 (key data k2) and the node n3, both of which are published.

The function F( ) is constituted by $F(k\_i, n\_j) = g^{\{k\_i + n\_j\}} \bmod p$ (where "p" indicates a prime number, and "g"

indicates a source), and the above-mentioned "r12" and "r13" are generated such that F(k1,n3) XOR r13=F(k2,n3) XOR r23 can be satisfied.

Non-Patent Document 1: "Digital Contents Protective Management Method" SCIS2001, pp. 213-218

Non-Patent Document 2: C. H. Lin. "Dynamic key management schemes for access control in a hierarchy" Computer Communications, 20:1381-1385, 1997

Non-Patent Document 3: J.-C. Birget, X. Zou, G. Noubir, B. Ramamurthy, "Hierarchy-Based Access Control in Distributed Environments" in the Proceedings of IEEE ICC, June 2001

DISCLOSURE OF INVENTION

Problems to be Solved by the Invention

As described above, the method for generating the same key data from different parent nodes when there are locally two or more parent nodes in the hierarchical key management method (FIG. 47 shows an example in which there are two parent nodes) has already been proposed. However, in (1) User multiple keying, there is a problem that a number of keys are to be prepared for each node, and the deeper the hierarchy becomes, that is, in proportion to the number of all nodes, the more key data to be held is increased. In (2) one-way function based keying schemes, the amount of key data to be held in each node is decreased by using the one-way hash function. However, there is a problem that it is necessary to separately hold public random data such as r12, r13, etc., and the deeper the hierarchy is as in the case of (1) above, the more data to be held is increased.

Furthermore, in (2) above, the power arithmetic is used for a one-way hash function. The configuration using a trap door hash function can also be considered. In any case, these arithmetic operations include a power arithmetic, thereby requiring a high calculation cost. Especially in a device provided with a small number of arithmetic resources such as a PDA, it takes a long time to perform a key calculation, thereby possibly failing in performing an interactive process when data is decoded.

Therefore, it is the purpose of the present invention to solve the above-mentioned problem and provide a key information processing method, a device thereof, and a program capable of safely constituting a key management method having an access structure identical to the hierarchical key management method with a small amount of calculation.

Means for Solving the Problems

To solve the above-mentioned problems, the key information processing method according to the present invention includes: a setting step of setting a set of execution rules of a one-way function for each of the elements having a hierarchical relationship; a key generation step of generating two or more individual keys for each element as a value obtained by executing the one-way function for each of two or more original keys depending on corresponding execution rules in a set of the execution rules set for the element; and a key delivery step of delivering the two individual keys for the elements to each element. The execution specification indicates the number of times the one-way function is executed.

In addition, the key information processing method for delivering a key by generating a key at each node from a parent node according to the hierarchical relationship expressed in a directed graph having no cycle includes: an initial key generation step of calculating N keys in a root node positioned at the top level; and a node key generation step of generating a value of the one-way function which has been executed the number of predetermined times depending on the execution rules for M keys (M≦N) among the N initial keys in each node, as the M node keys for the node. The method further includes a key delivery step of delivering a node key from each of the nodes to a child node or a descendant node. When the directed graph has a portion where plural different nodes are connected to each other through a directed graph, the nodes are processed as one node. The method further includes a number-of-initial key calculation step of calculating the number N of the initial keys from the structure of the directed graph.

The key information processing apparatus according to the present invention includes: setting means for setting a set of execution rules of the one-way function for each of the elements having a hierarchical relationship; key generation means for generating two or more individual keys for each element as a value obtained by executing the one-way function for each of two or more original keys depending on corresponding execution rules in a set of the execution rules set for the element; and key delivery means for delivering the two individual keys for the elements to each element.

In addition, the key information processing apparatus capable of generating a key at each node from a parent node according to the hierarchical relationship expressed in a directed graph having no cycle includes: initial key generation means for calculating N keys in a root node positioned at the top level; and node key generation means for generating a value of the one-way function which has been executed the number of predetermined times depending on the execution rules for M keys (M≦N) among the N initial keys in each node, as the M node keys for the node.

A computer-readable program according to the present invention is used to direct the computer to conduct a key information processing method including: a setting step of setting a set of execution rules of the one-way function for each of the elements having a hierarchical relationship; a key generation step of generating two or more individual keys for each element as a value obtained by executing the one-way function for each of two or more original keys depending on corresponding execution rules in a set of the execution rules set for the element; and a key delivery step of delivering the two individual keys for the elements to each element. The program is also used to direct the computer to conduct the key information processing method capable of delivering a key by generating a key at each node from a parent node according to the hierarchical relationship expressed in a directed graph having no cycle, and including: an initial key generation step of calculating N keys in a root node positioned at the top level; and a node key generation step of generating a value of a one-way function which has been executed the number of predetermined times depending on the execution rules for M keys (M≦N) among the N initial keys in each node, as the M node keys for the node.

Other features and advantages of the present invention are clearly described in the descriptions below by referring to the attached drawings. In the attached drawings, the same or identical configurations are assigned the same reference numerals.

BRIEF DESCRIPTION OF DRAWINGS

FIG. 13 shows the first example of a key generating graph according to the second embodiment of the present invention;

FIG. 14 shows the second example of a key generating graph according to the second embodiment of the present invention;

FIG. 20 shows another example of a key generating graph having a different number of levels for each hierarchical axis according to the second embodiment of the present invention;

FIG. 26 shows the key delivery matrix showing the in progress status of constituting a key delivery matrix according to the third embodiment of the present invention;

FIG. 27 shows the key delivery matrix showing the in-progress status of constituting a key delivery matrix according to the third embodiment of the present invention;

FIG. 28 shows the key delivery matrix showing the in-progress status of constituting a key delivery matrix according to the third embodiment of the present invention;

FIG. 32 shows the second example of a directed graph according to the third embodiment of the present invention;

FIG. 33 is an explanatory view of the third example of dividing a node in the directed graph shown in FIG. 32 according to the third embodiment of the present invention;

FIG. 38 shows the key delivery matrix showing the in-progress status of constituting a key delivery matrix according to the third embodiment of the present invention;

FIG. 39 shows the third example of a key generating graph according to the third embodiment of the present invention;

FIG. 40 shows an example of the directed graph in which a node having a connection relationship exists in both directions according to the third embodiment of the present invention;

FIG. 43 is a table showing the list of images to be encrypted by each node according to the embodiments of the present invention;

FIG. 44 shows the concept for explanation of the binary tree access structure in the tree structure management method;

FIG. 45 shows the concept for explanation of the access structure in the hierarchical access control method;

FIG. 46 shows the concept for explanation of the access structure in the hierarchical access control method;

BEST MODE FOR CARRYING OUT THE INVENTION

The preferred embodiments of the present invention are described below by referring to the attached drawings.

Figure 1:
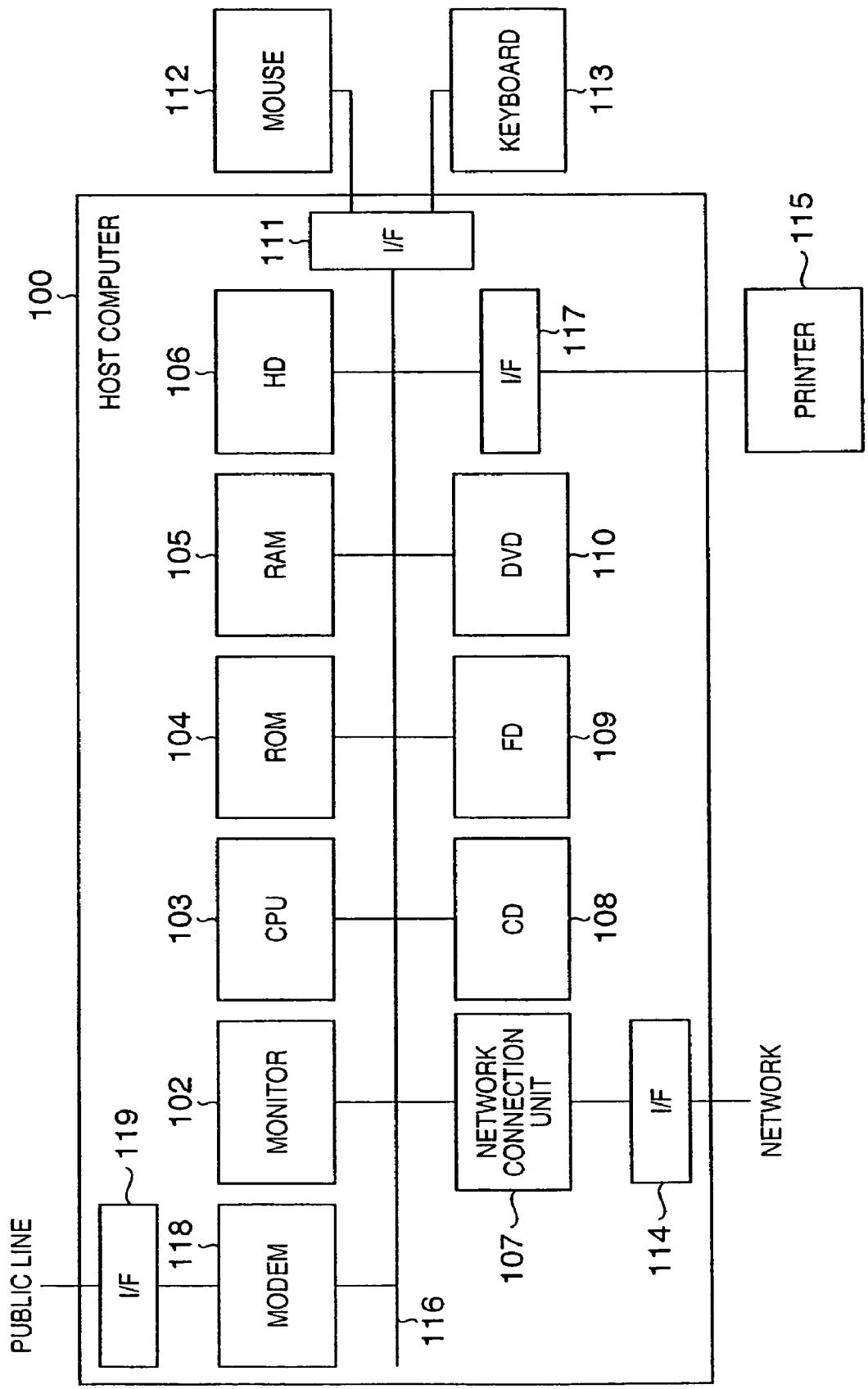
FIG. 1 is a block diagram of the configuration of the processing device according to an embodiment of the present invention.

An Example of the Configuration of the Key Information Processing Apparatus According to an Embodiment of the Present Invention FIG. 1 is a block diagram conceptually showing the configuration of the key information processing apparatus according to an embodiment of the present invention.

In realizing the present invention, it is not essential to use all functions shown in FIG. 1.

In FIG. 1, a key information processing apparatus 100 includes a modem 118 of a public line, etc., a monitor 102 as a display unit, a CPU 103, ROM 104, RAM 105, an HD (hard disk) 106, a network connection unit 107 of a network, a CD 108, an FD (flexible disk) 109, a DVD (digital video disk or a digital versatile disk) 110, an interface (I/F) 117 of a printer 115, and an interface (I/F) 111 of a mouse 112, a keyboard 113, etc. as an operation unit. These components are interconnected to one another for communications through a bus 116.

The mouse 112 and the keyboard 113 are the operation units for input of various instructions by a user to the key information processing apparatus 100. The information (operation information) input through the operation unit is fetched to the key information processing apparatus 100 through the interface 111.

Each type of information (character information, image information, etc.) about the key information processing apparatus 100 can be printed out on the printer 115.

The monitor 102 displays various types of information such as various types of instruction information to a user, character information, image information, etc.

The CPU 103 controls the operation of the entire key information processing apparatus 100, and controls the entire key information processing apparatus 100 by reading a processing program (software program) from the HD (hard disk) 106, etc. and executing it. Especially, according to the embodiments, the CPU 103 performs information processing described later by reading a processing program for generating a key from the HD 106, etc., and executing it.

The ROM 104 stores a processing program for generating a key and various data (key generating graph, etc.) for use in a program.

The RAM 105 is used as a work area, etc. for temporarily storing a processing program and the information to be processed for use in various processes by the CPU 103.

The HD 106 is a component as an example of a large-capacity storage device, and stores various data, or a processing program, etc. for a transform process, etc. on the information to be transferred to the RAM 105, etc. when various processes are executed.

The CD (CD drive) 108 reads data stored on the CD (CD-R) as an example of an external storage medium, and has the function of writing data to the CD.

Like the CD 108, the FD (floppy (R) disk drive) 109 reads data stored on the FD 109 as an example of an external storage medium. It also has the function of writing various types of data to the FD 109.

Like the CD 108 and the FD 109, the DVD (digital video disk) 110 reads data stored on the DVD 110 as an example of an external storage medium, and has the function of writing data to the DVD 110.

If an external storage medium such as the CD 108, the FD 109, the DVD 110, etc. stores, for example, an editing program or a printer driver, then the program or the driver can be installed on the HD 106, and transferred to the RAM 105 as necessary.

The interface (I/F) 111 accepts input from a user by the mouse 112 or the keyboard 113.

The modem 118 is a communication modem, and connected to an external network through an interface (I/F) 119, for example, a public line, etc.

The network connection unit 107 is connected to an external network through an interface (I/F) 114.

First Embodiment of Generating/Managing a Key According to the Present Apparatus The first embodiment of generating and managing a key by the above-mentioned apparatus is explained below. First, the generation of an individual key in each node in the hierarchical key management method is described below. A key is generated according to the key generating graph shown in FIGS. 2 and 3.

[Summary of the Generation of a Key]

An individual key in each node can be one of two types, that is, an A-type key obtained by performing a hash function on the two original keys common to all nodes, and a B-type key obtained only when there are three or more nodes in the same hierarchical level. A group referred to as a "rank" as a set of nodes in the same hierarchical level is defined for convenience. The root node is assigned a rank 1, and the rank number is increased by 1 each time a hierarchical level is passed.

[A-type Key]

Figure 2:
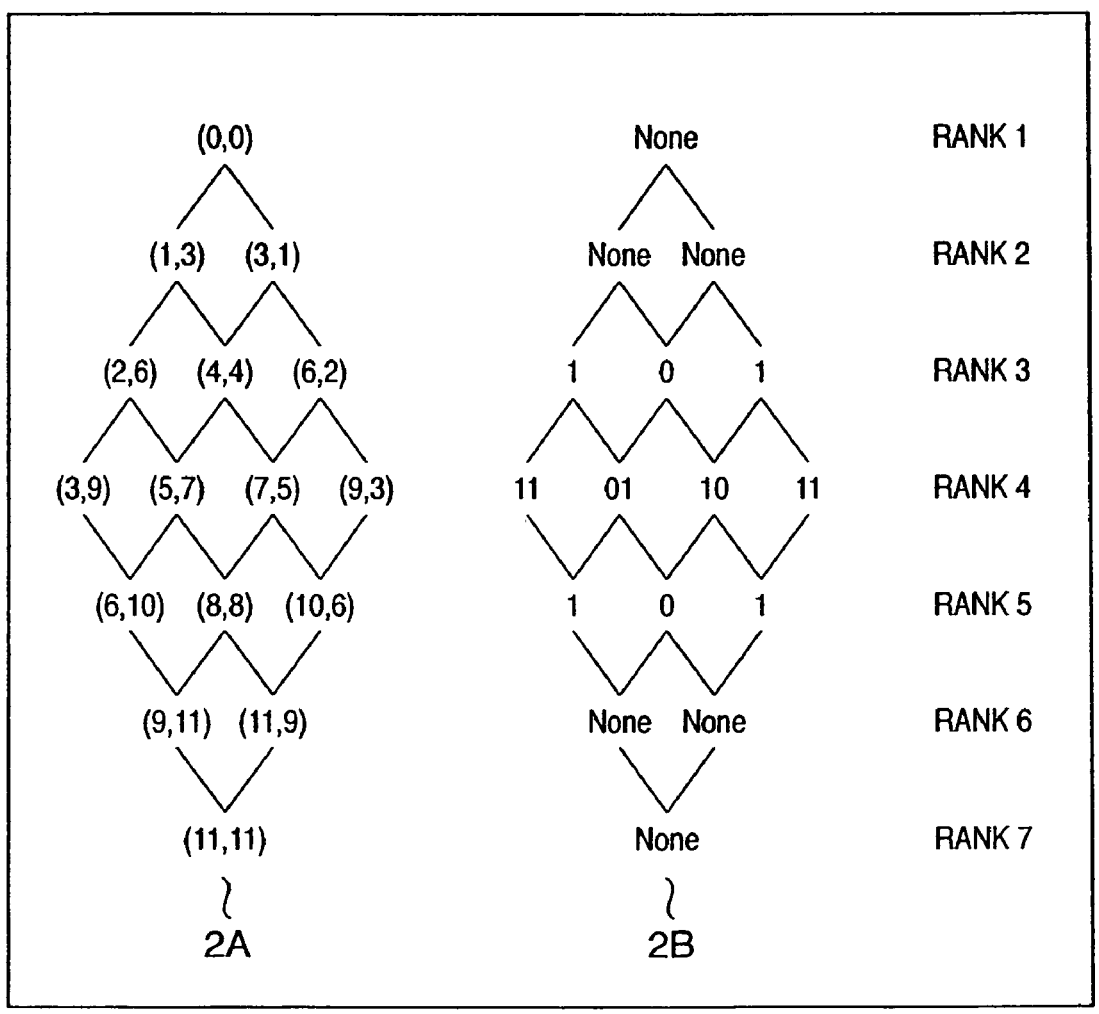
FIG. 2 shows the first example of a key generating graph according to the first embodiment of the present invention.
Figure 3:
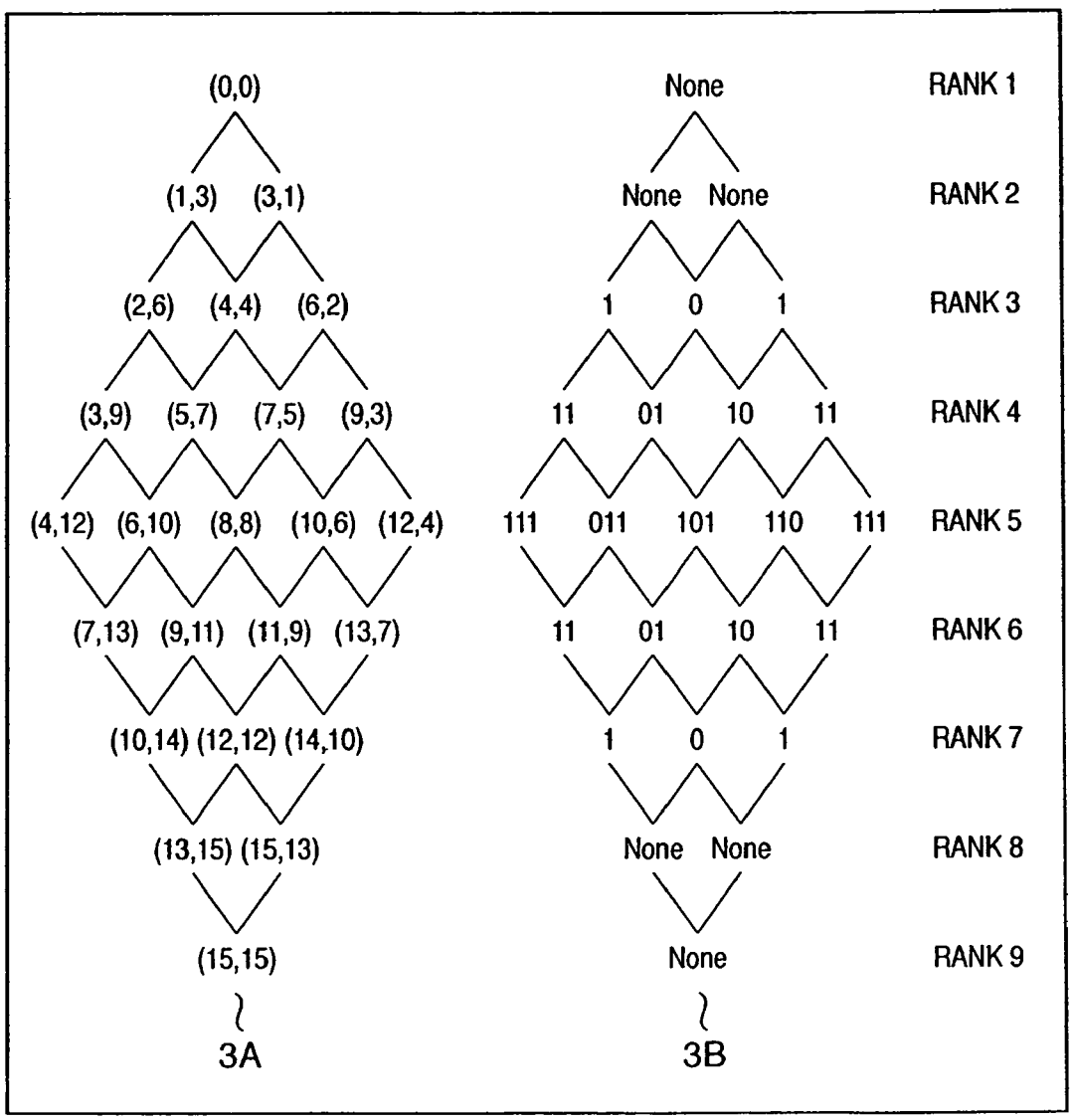
FIG. 3 shows the second example of a key generating graph according to the first embodiment of the present invention.

An example of an A-type key is explained below by referring to 2A shown in FIGS. 2 and 3A shown in FIG. 3. Two original keys as the sources of generating all A-type keys are defined as x and y. The two numbers assigned to the respective nodes in 2A shown in FIGS. 2 and 3A shown in FIG. 3 express the number of times the hash function is executed respectively for x and y. For example, in the node described with (2, 4), H(H(x)) and H(H(H(H(y)))) are to be held as an A-type key. When a hash arithmetic operation is hereafter performed n times, it is expressed by "H^n( )" for short. Using the notation, the node expressed by (2, 4) can have two A-type keys of "H^2(x)" and "H^4(y)".

[B-type Key]

An example of a B-type key is explained below by referring to 2B shown in FIGS. 2 and 3B shown in FIG. 3. Note that 2B shown in FIGS. 2 and 3B shown in FIG. 3 have the hierarchical structures similar to those of 2A shown in FIGS. 2 and 3A shown in FIG. 3 respectively. There are no these keys in the ranks 1 and 2. In the rank 3, from the A-type key expressed by (2, 2), the coupled and hashed result of H(H^2(x)||H^2(y)) is defined as R30. The rank 3 shown in FIG. 2(B) expresses the number of times the hash function is executed on the R30. The three nodes in the rank 3 indicate that they, from left to right, respectively hold the B-type keys H(R30), R30, and H(R30).

The rank 4 is described with two numerals which express the number of times the hash function is executed on the R40 and R41. The R40 and R41 are generated from the data shared among all nodes in the rank 3. For example, when they are generated from the B-type key, H(H(R30)||RND1) and H(H(R30)||RND2) are respectively defined as R40 and R41 from the public data RND1 and RND2. To generate R40 and R41, note that the R41 and R40 cannot be calculated respectively from R40 and R41. Additionally, there is a method of using HMAC, etc.

In 2B shown in FIG. 2 or 3B shown in FIG. 3, the four nodes in the rank 4 indicate that, from left to right, hey respectively hold the B-type keys H(R40) and H(R41), R40 and H(R41), H(R40) and R41, and H(R40) and H(R41). Relating to the subsequent ranks, an identical method is used. When there are two or less nodes in the same rank, the B-type key is not generated. That is, there is no B-type key in the ranks 6 and 7 in 2B shown in FIG. 2 and in the ranks 8 and 9 in 3B shown in FIG. 3.

[Method of Generating a Key Generating Graph]

The graphs shown in FIGS. 2 and 3 are generated according to the following rules. First, the method of generating an A-type graph is explained below by referring to the flowchart shown in FIG. 4.

(1) The key in the rank 1 is defined as $\{(0, 0)\}$ (step S401).
(2) The key in the rank 2 is defined as $\{(1, 3), (3, 1)\}$ (step S402).
(3) The variable i is defined as 3. That is, i:=3 (step S403).
(4) In the rank i (i≧3), the maximum element in the rank (i−1) is Q (step S404).

Assuming that the number of nodes in the rank i is #R(i), if #R(i)>#R(i−1), then the key is $\{(Q-2*\#R(i)+5, Q+3), (Q-2*\#R(i)+7, Q+1), \ldots, (Q+3, Q-2*\#R(i)+5)\}$. If #R(i)<#R(i−1), then the key is $\{(Q-2*\#R(i)+3, Q+1), (Q-2*\#R(i)+5, Q-1), \ldots, (Q+1, Q-2*\#R(i)+3)\}$ (step S405).

(5) If #R(i+1)=0, the process terminates (step S406). Otherwise, i:=i+1, and control is passed to (4) above (step S407).

By selecting the following subroutine before passing control to the process (4) above, the amount of arithmetic operation using a hash function can be reduced.

In the (4-1) rank i, when #R(i)<#R(i−1) and #R(i)=3, the key is $\{(Q-3, Q), (Q-1, Q+2), (Q, Q+3)\}$, and control is passed to (5) above.

In the (4-2) rank 1, when #R(i)<#R(i−1) and #R(i)=2, the key is $\{(Q-1, Q), (Q, Q-1)\}$, and control is passed to (5) above.

In the (4-3) rank i, when #R(i)<#R(i−1) and #R(i)=1, the key is $\{(Q, Q)\}$, and control is passed to (5) above.

Figure 5:
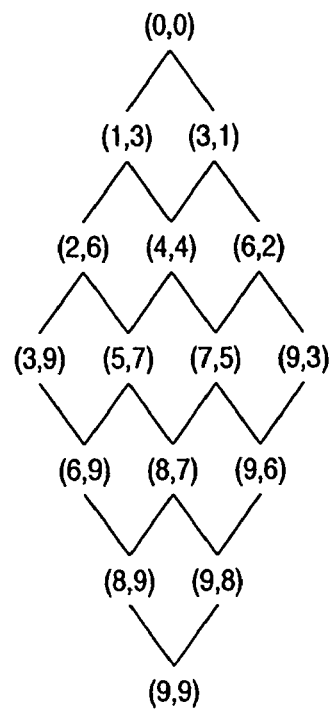
FIG. 5 shows the third example of a key generating graph according to the first embodiment of the present invention.
Figure 6:
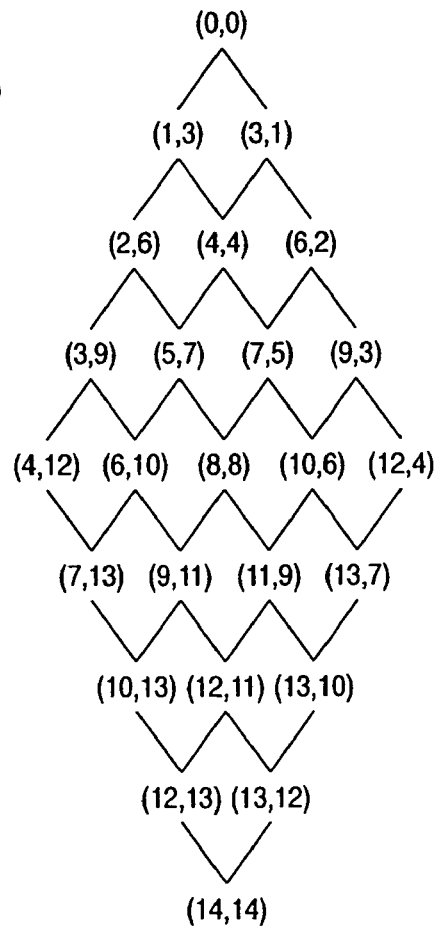
FIG. 6 shows the fourth example of a key generating graph according to the first embodiment of the present invention.

When the subroutine is selected, the key generating graph as shown in FIG. 5 is obtained for 2A shown in FIG. 2 and the key generating graph as shown in FIG. 6 is obtained for 3A shown in FIG. 3.

Figure 7:
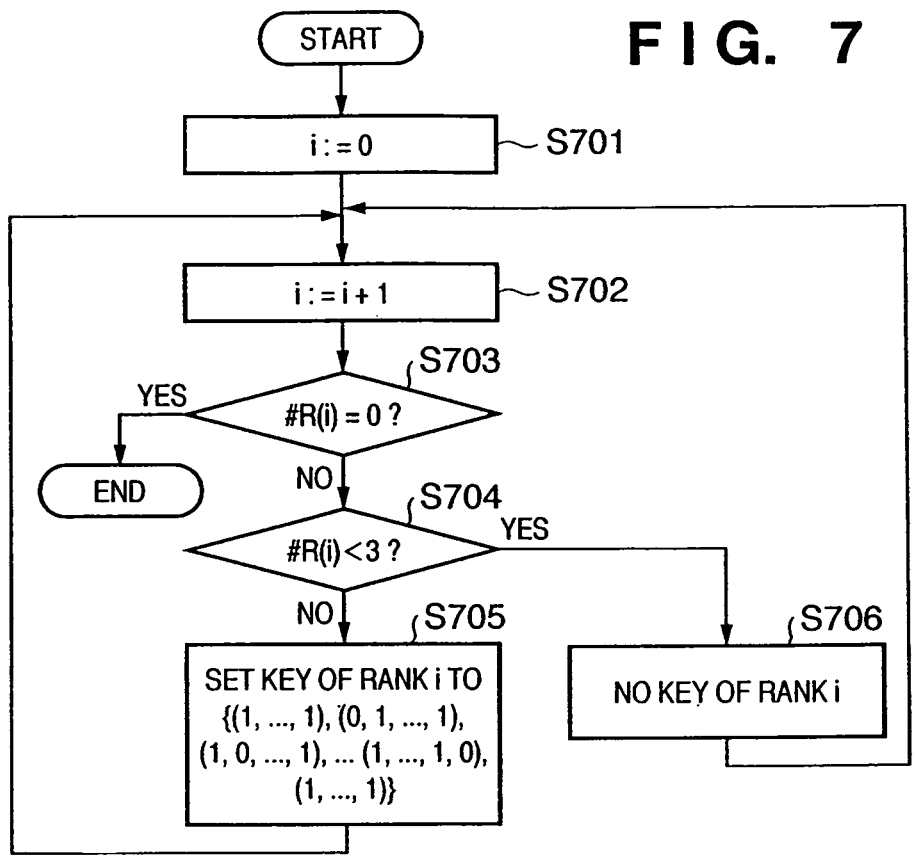
FIG. 7 shows the concept showing the flowchart of generating a B-type key according to the first embodiment of the present invention.

The method for generating a B-type graph is explained by referring to the flowchart shown in FIG. 7. The notation #R(i) is described above.

(1) The variable i is set to 0. That is, i:=0 (step S701).
(2) i:=i+1 (step S702).
(3) If #R(i)=0, then the process terminates (step S703).
(4) If #R(i)<3, it is determined that there is no key for the rank i, and control is passed to (2) (steps S704 and S706).
(5) The number of elements of each key in the rank i is #R(i)−2, and the keys are set to $\{(1, \ldots, 1), (0, 1, \ldots, 1), (1, 0, \ldots, 1), \ldots, (1, \ldots, 1, 0), (1, \ldots, 1)\}$, and control is passed to (2) (step S705).

The process (5) is constituted by all 1 on both ends. Otherwise, "0" appears only in one position (However, it does not appear in the same position). If #R(i)=6, and the keys are set to $\{(1,1,1,1), (0,1,1,1), (1,0,1,1), (1,1,0,1), (1,1,1,0), \text{ and } (1,1,1,1)\}$.

[Validity of Generating a Key]

The method for generating the graph is defined to satisfy the following conditions.

A parent node can generate a key of a child node.

The key of a parent node cannot be generated according to the key information about a child node (unless the one-way function becomes weak).

The key of an upper node cannot be generated with a plurality of entities combined.

With all these conditions, a hierarchical key management method capable of safely generating and delivering a key can be realized.

[Key Delivery]

A method of delivering a key to each node by a root key deliverer (entity of a root node) and a method of delivering a key to a lower node by an entity for holding an individual key other than a root key deliverer are described below. First, the root key deliverer safely generates keys x and y at random, and defines them as the individual keys of the deliverer. In the procedure of generating the key, plural keys are arranged in each node. The root key deliverer safely delivers the key of each node to the entity positioned in each node. Furthermore, the key delivery graphs as shown in FIGS. 2 and 3 are published, and the data for identifying where the delivered key is positioned within the graph is delivered to each entity. It is assumed that the data is constituted by, for example, a rank number and an intra-rank identification number indicating what number rank in the same rank.

Next, the method of delivering a key by an entity having an individual key other than a root key deliverer is explained below. The key data for a child node or a grandchild node is generated according to the individual key and the identification data indicating the position of the key in the key delivery graph. For example, in 2A shown in FIG. 2, if x', y' is held as an A-type key, and it is the first key in the rank 3 in the position on the graph, it corresponds to (2, 6). Since the entity is $H^5(x)=H^3(H^2(x))=H^3(x')$ and $H^7(y)=H(H^6(y))=H(y')$ for the second child node (corresponding to (5, 7)) in the rank 4, $H^3(x')$ and H(y') can be delivered as a key of the child node (5, 7). Similarly, it is obvious that a key for another child node and grandchild node can be generated.

Furthermore, relating to the B-type key, according to the above-mentioned generating procedure, the key in each rank is generated in order from the key of the upper rank. Since the operation is the same as that of the root key deliverer, the explanation is omitted here.

[Key Generating and Delivering Process in the Information Processing Device]

The procedure of performing the above-mentioned key generating and delivering process in the key information processing apparatus 100 is described below. The data to be managed such as an image, etc. is obtained through the CD 108 or the network connection unit 107 of a network and stored on the HD 106, or selected from the data already stored on the HD 106. The user selects the data using the mouse 112 or the keyboard 113 from the listing displayed on the monitor 102.

When the user selects the access control structure such as the information about the number of the hierarchical levels of a hierarchical axis for the data to be managed using the similar method, the key generating graph corresponding to the structure is calculated using the CPU 103 and stored in the RAM 105, the HD 106, and so on.

Random data is generated from the data stored on the ROM 104, the RAM 105, and the HD 106 or the data of the operation, etc. of the mouse 112, plural original keys are generated using the random data, and stored on the RAM 105, the HD 106, etc. Furthermore, an individual key of each node in the key generating graph is calculated from an original key, and stored on the RAM 105, the HD 106, etc.

An individual key stored on the RAM 105, the HD 106, etc. is read and delivered to another information processing device through the network connection unit 107 via the network.

[Hierarchical Access Structure Having a Different Number of Levels for Each Hierarchical Axis]

Figure 8:
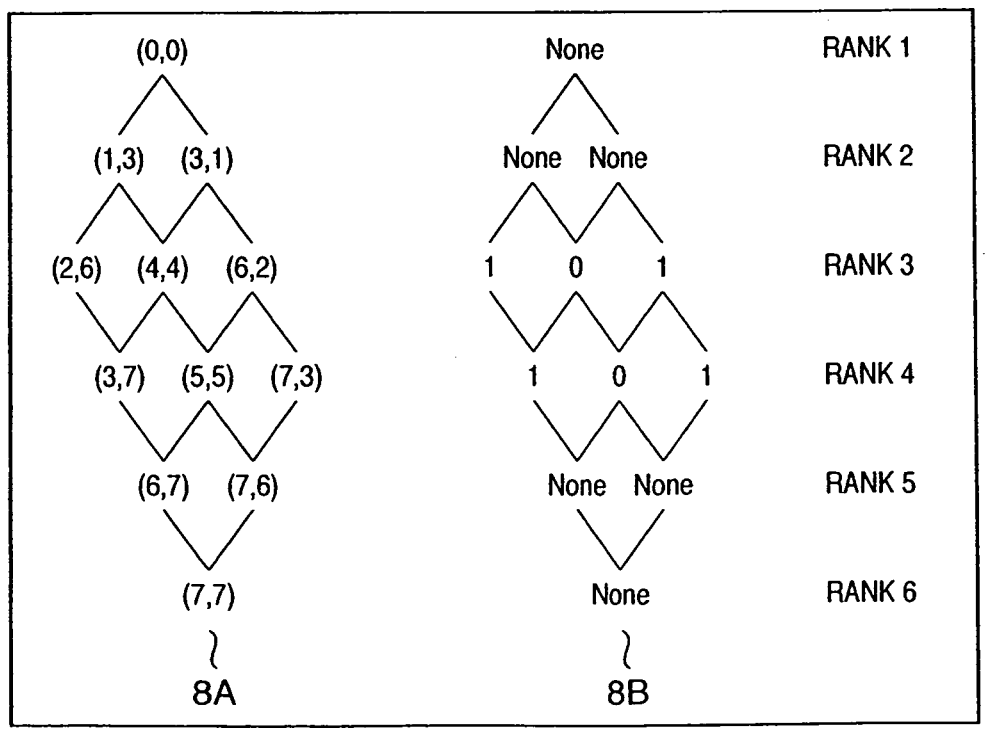
FIG. 8 shows an example of a key generating graph indicating different number of levels for each hierarchical axis according to the first embodiment of the present invention.

In FIGS. 2 and 3, only an example of a hierarchical axis having the same level is explained (level 3 for the hierarchical axis in FIG. 2, and level 4 for the hierarchical axis in FIG. 3). However, FIG. 8 shows an example of different levels generated in the similar method. In 8A and 8B shown in FIG. 8, there are three levels in the lower left direction, and four levels in the lower right direction. According to the flowchart shown in FIGS. 4 and 7, the process can be normally performed.

A Variation of First Embodiment

According to the first embodiment, the B-type key is generated from the key data in the ranks in between, but the merging method for the root key deliverer generating and delivering initial data in the same framework as the A-type key is explained below.

Figure 9:
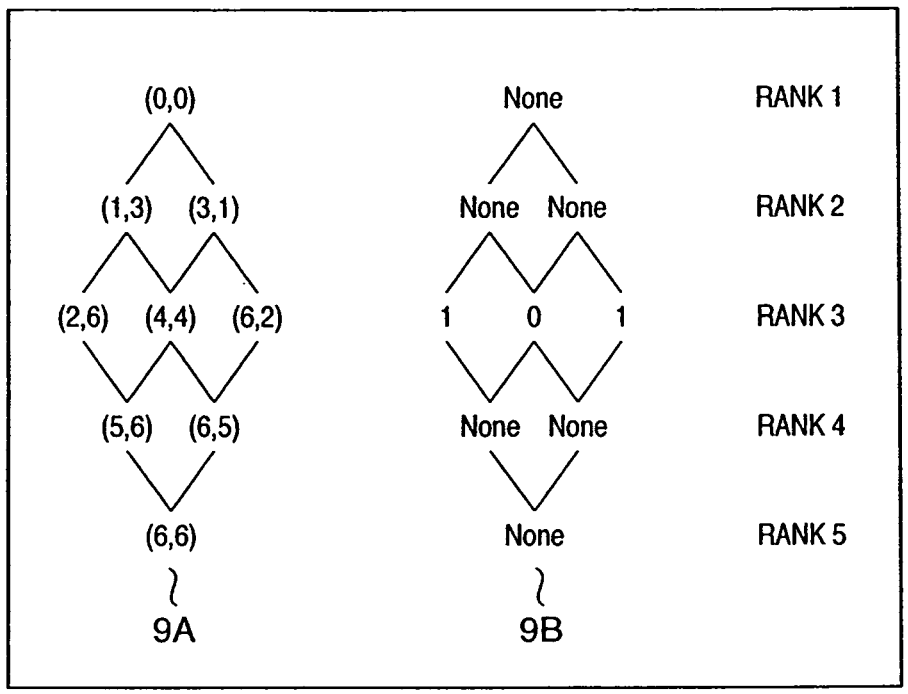
FIG. 9 shows the fifth example of a key generating graph according to the first embodiment of the present invention.
Figure 10:
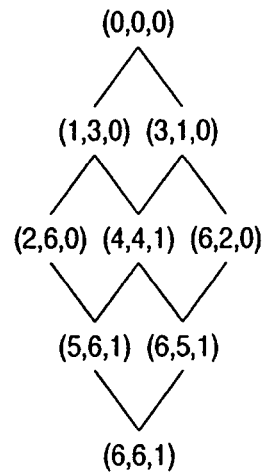
FIG. 10 shows the sixth example of a key generating graph according to the first embodiment of the present invention.

9A and 9B in FIG. 9 show examples of the configurations according to the first embodiment when there are three levels for each hierarchical axis. FIG. 10 shows the method of generating an original key of "z" which is different from x, y at the initial stage, not the method of generating the B-type key shown in FIG. 9 during the process. The notation is similar to that shown in FIG. 2, and the third element indicates the number of times the hash function is performed on the original key "z". Practically, the original key "z" is delivered as is, and as the key information about a child node in the ranks 1 and 2 where there is no B-type key. In the rank 3, "z" is processed as the initial key R30 according to the method described in 9B shown in FIG. 9. In the rank 4 or less, "h(z)" is delivered.

Figure 11:
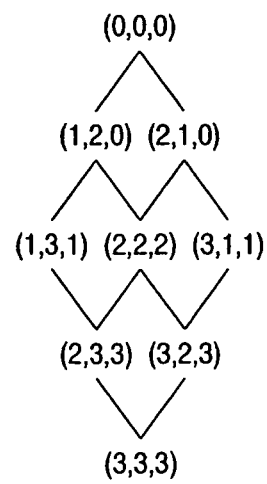
FIG. 11 shows the seventh example of a key generating graph according to the first embodiment of the present invention.

In the merging method, the function of avoiding the collusion attack by plural nodes in the same layer is not concentrated on the third original key, but can be distributed between the first and second original keys. The key generating graph shown in FIG. 11 is an example. Thus, a graph for reducing the total amount of hash arithmetic operation can be designed.

Second Embodiment of Generating and Managing a Key by the Present Apparatus

Described below is the second embodiment of generating and managing a key by the above-mentioned apparatus.

[Summary of Generating a Key]

First described below is the generation of an individual key of each node in the hierarchical key management method.

Figure 12:
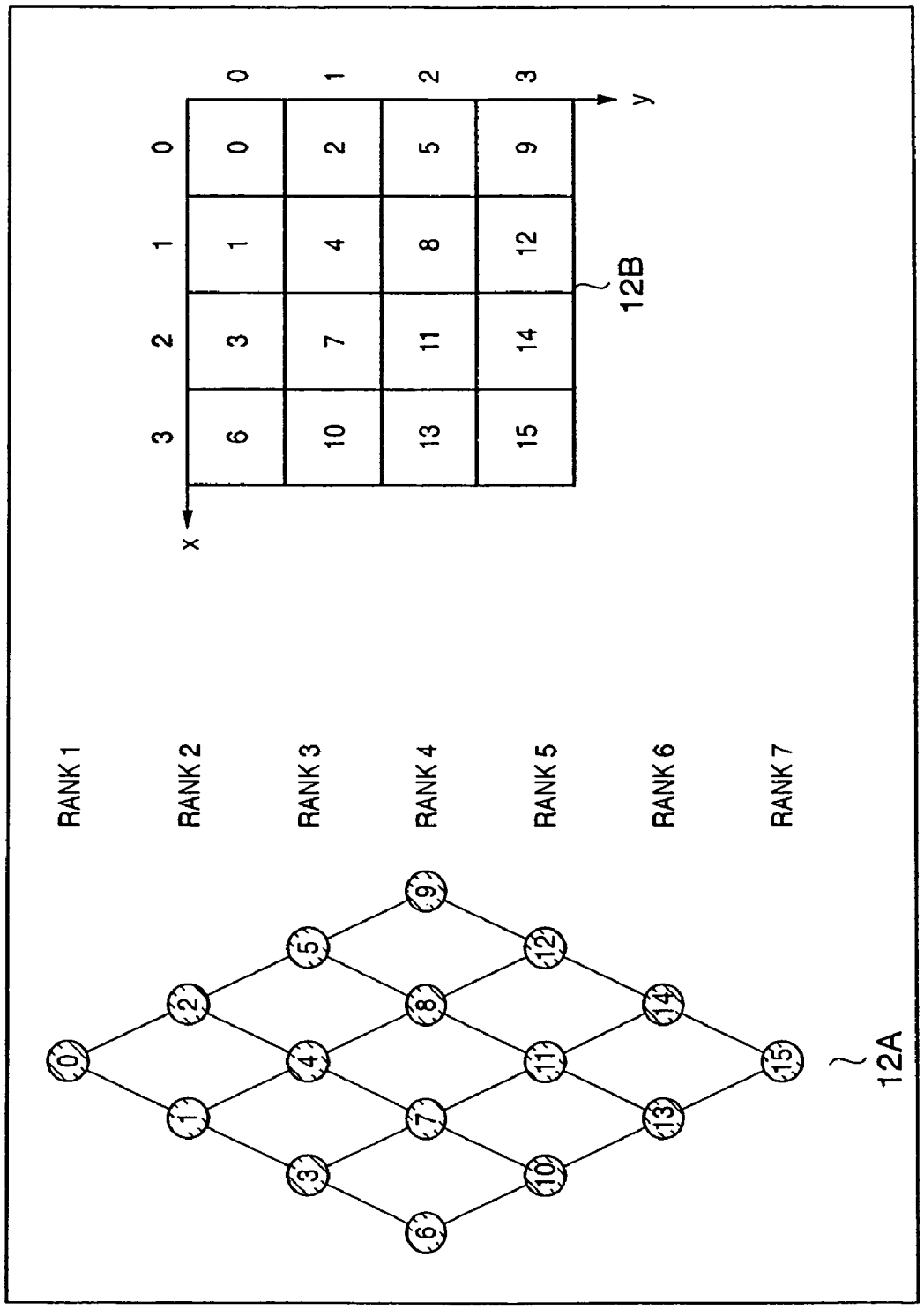
FIG. 12 is an explanatory view of the correspondence between the tree structure and the matrix according to the second embodiment of the present invention.

In the explanation below, as shown in FIG. 12, the tree structure in the hierarchical key management method is replaced with a matrix for convenience. 12A in FIG. 12 is formed by seven hierarchical levels and shows an example of the tree structure having 16 nodes. 12B in FIG. 12 shows an example in which the tree structure shown in 12A in FIG. 12 is replaced with a matrix. The numeral described in each node shown in 12A in FIG. 12 corresponds to the numeral described in each cell in 12B in FIG. 12.

In the tree structure shown in 12A in FIG. 12, the root node (indicated by "0" in FIG. 12) corresponds to the top right cell in the matrix. In the child nodes in each node in the tree structure, the left nodes and the right nodes are respectively associated with the left cells and the lower cells in the matrix cells. The association is sequentially performed on all nodes and cells, thereby replacing the tree structure shown in 12A in FIG. 12 with the matrix in 12B shown in FIG. 12.

Next, the generation of a key according to the embodiments is explained. A key is generated according to key generating matrix and graph shown in FIGS. 13 and 14.

An individual key for each element and node can be an A-type key obtained by performing a hash function from two original keys common to all nodes in the tree structure, and a B-type key obtained only in the nodes other than a leaf node (having no child node).

In the tree structure, a group referred to as a "rank" which is a set of nodes existing at the same hierarchical level is defined for convenience. The root node is defined as a rank 1, and the rank number is incremented by 1 each time a hierarchical level is passed (refer to 12A shown in FIG. 12).

In the matrix, to express the coordinates of each cell, the top right element is defined as the origin (0, 0), the x coordinate increases in the horizontally left direction, and the y coordinate increases in the vertically downward direction. According to the definitions, for example, the coordinates of the element "4" shown in 12B in FIG. 12 are expressed by (1, 1), and the coordinates of the element "14" are expressed by (2, 3) (refer to 12B shown in FIG. 12).

In the following explanation, the number of cells in the horizontal direction of the matrix is Nx, and the number of cells in the vertical direction is Ny.

[A-type Key]

An example of an A-type key is explained below by referring to 13A shown in FIGS. 13 and 14A shown in FIG. 14. 13A shown in FIG. 13 shows an example of a matrix of A-type keys expressed by Nx=4, Ny=4, and 14A shown in FIG. 14 shows an example of a matrix of A-type keys expressed by Nx=5, Ny=5. The two original keys as the source in generating all A-type keys are defined as x and y. In 13A in FIGS. 13 and 14A in FIG. 14, the two numerals described in the respective cells indicate the number of times the hash function is performed on x and y. For example, the cell described with [1, 4] is to hold H(x) and H(H(H(H(y)))) as an A-type key. When the hash arithmetic operation is hereafter performed n times, it is expressed by H^n( ) for short. According to the notation, a cell described with [1,4] has two A-type keys of H(x) and H^4(y).

[B-type Key]

An example of a B-type key is explained below by referring to 13B shown in FIGS. 13 and 14B shown in FIG. 14. Note that 13B in FIGS. 13 and 14B in FIG. 14 have the same matrix sizes as 13A in FIGS. 13 and 14A in FIG. 14. No keys exist for the bottom row and the leftmost column in the matrix. The symbol 'N' is used to indicate that there is no key. The value of the A-type key whose size is Nx−2 and Ny−2 is applied as is to the cells other than in the leftmost column, the rightmost column, the bottom row, and the top row. Except these cells, each of the cells in the top row is assigned the value of one cell below as is, and each of the cells in the rightmost row is assigned the value of one cell to the left as is.

The two original keys as the source in generating all A-type keys are defined as u and v. As with the A-type key, in 13B in FIGS. 13 and 14B in FIG. 14, the two numerals added to the respective cells indicate the number of times the hash function is performed on u and v.

As shown in 14C in FIG. 14, when the size of the larger in the matrix of B-type key is 5 or more, the merged key having the size of Nx−2 and Ny−2 as shown in 14C in FIG. 14 is applied. The details of the merged key are described later.

[Merged Key]

Figure 15:
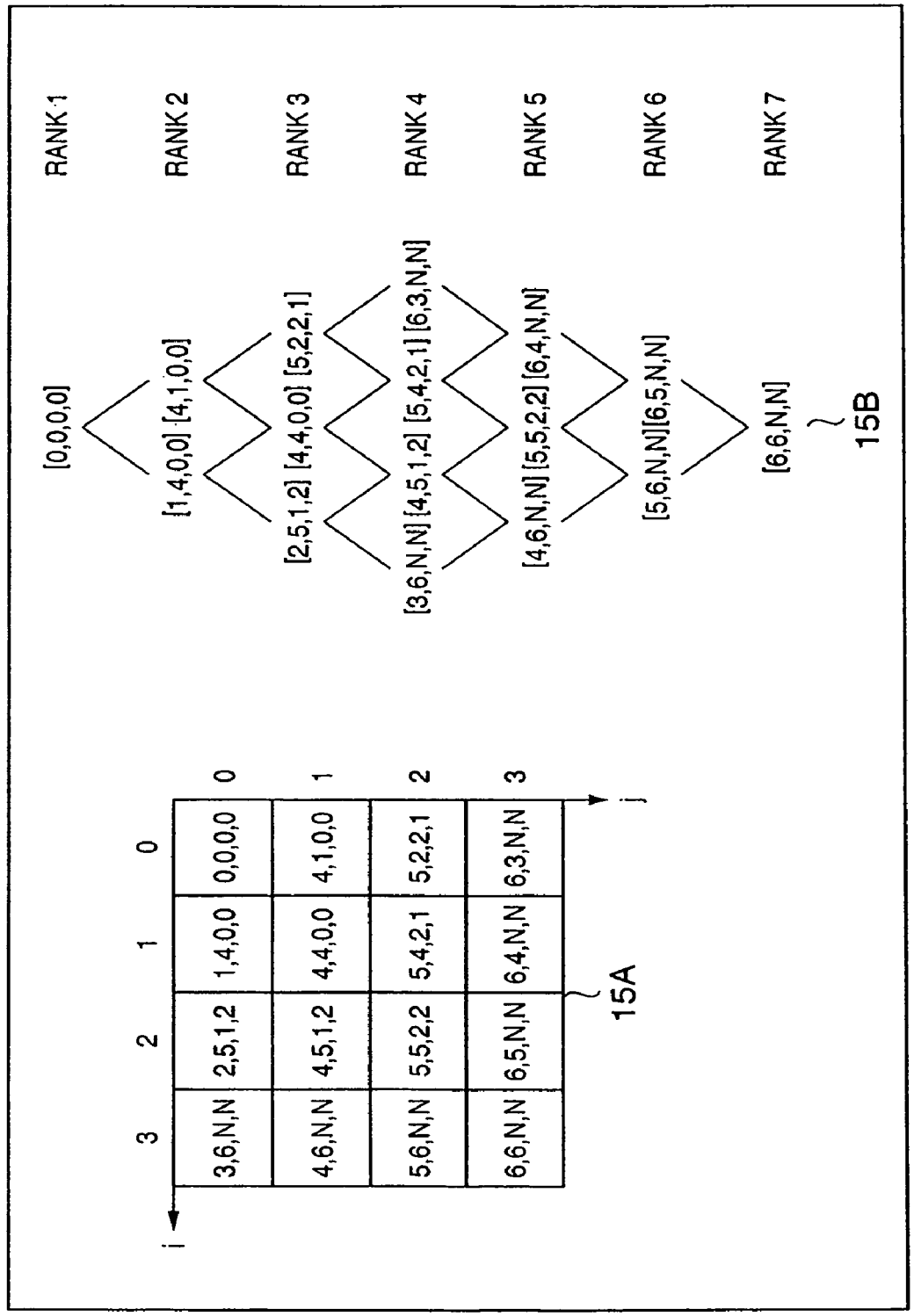
FIG. 15 is an explanatory view of the merged key according to the second embodiment of the present invention.

In the embodiments, the A-type key and the B-type key described above are merged and used. In the description below, the key obtained by merging the A-type key with the B-type key is referred to as a merged key. FIG. 15 shows the matrix (15A shown in FIG. 15) of the merged key having Nx=4 and Ny=4 as shown in FIG. 13. As shown in FIG. 15, the A-type key and the B-type key positioned in the same cell are merged, and the corresponding merged key is generated. For example, in 15A shown in FIG. 15, the cell (1,2) indicates that it holds a merged key having H^5(x), H^4(y), H^2(u), and H(v).

As described above, the key matrix according to the embodiments as described above can also be expressed as a tree structure. An example of the case where a matrix-shown in 15A in FIG. 15 is expressed by a tree structure is shown in 15B in FIG. 15.

[Method of Generating a Key Generating Graph]

Next, by referring to FIG. 16, the method of generating a merged key according to the embodiments is explained below.

Figure 16:
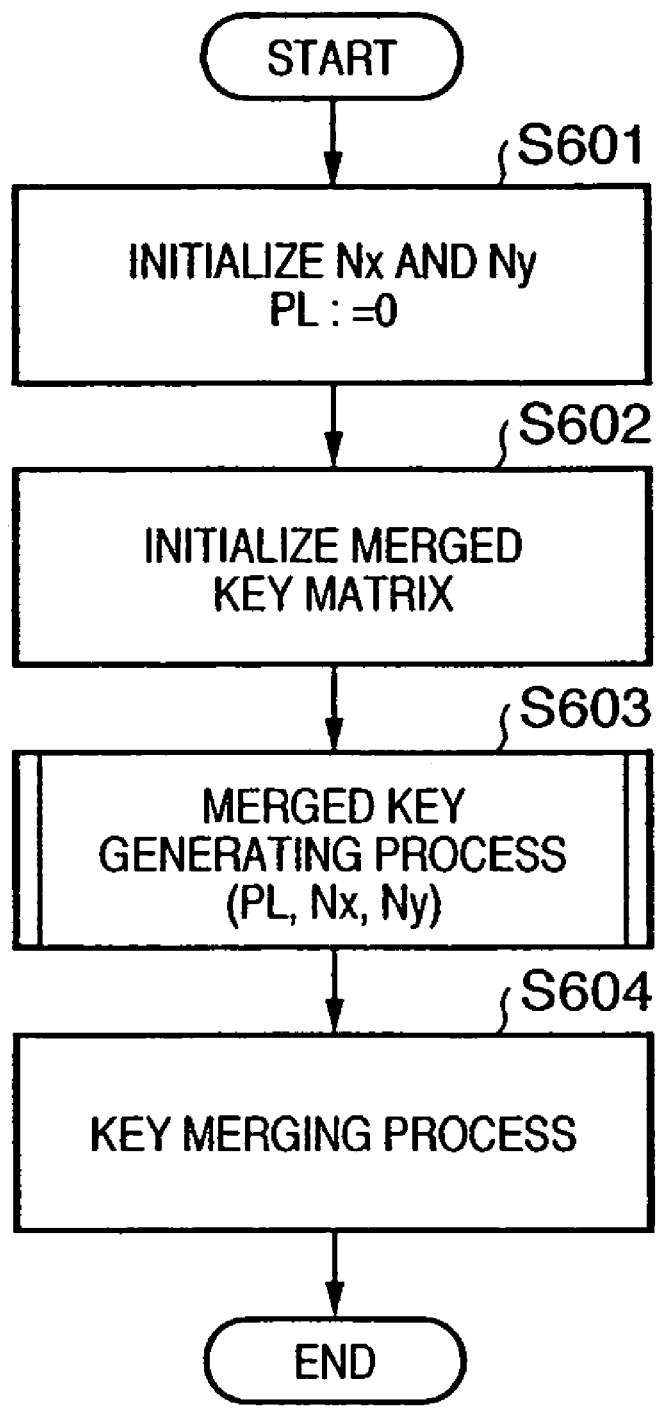
FIG. 16 is a flowchart of generating the merged key according to the second embodiment of the present invention.

As shown in FIG. 16, the variables Nx and Ny indicating the numbers of cells in the horizontal and vertical directions in the merged key matrix are initialized on step S601. They can be set using appropriate values depending on the numbers of objects to be access controlled. For example, when access control is performed depending on the resolution and image quality on the image data having, for example, six resolutions and five image quality levels, the setting is "Nx=6 and Ny=5" and the like. However, the present invention is not limited to this application, but can be optionally applied depending on various types of access control. Furthermore, the variable PL indicating the process level is initialized to "0".

Next, in step S602, the number of elements stored in each cell in the merged key matrix is initialized. In the embodiments, the number of merged keys to be stored in one cell generated in the merged key generating process described later is set as the number of elements. In the merged key generating process according to the embodiments, Min (Nx, Ny) merged keys are generated for one cell. Therefore, the number of elements is set to Min (Nx, Ny). Min (a, b) refers to an arithmetic operation for selecting a smaller value between "a" and "b". For example, as described above, when Nx=6 and Ny=5, the number of elements to be stored in one cell is initialized to 5.

In step S603, the merged key matrix having the size Nx*Ny at the process level PL is generated. The details of the merged key generating process according to the embodiments are described later.

In step S604, each of the merged keys at the process level PL is merged to one merged key matrix. In the embodiments, the A-type key of the process level PL=0 is merged with the B-type key of the process level PL=0, and all subsequently (at process level PL1 and higher) generated B-type keys are merged.

Described above is the processing method of generating a merged key according to the embodiments.

Figure 17:
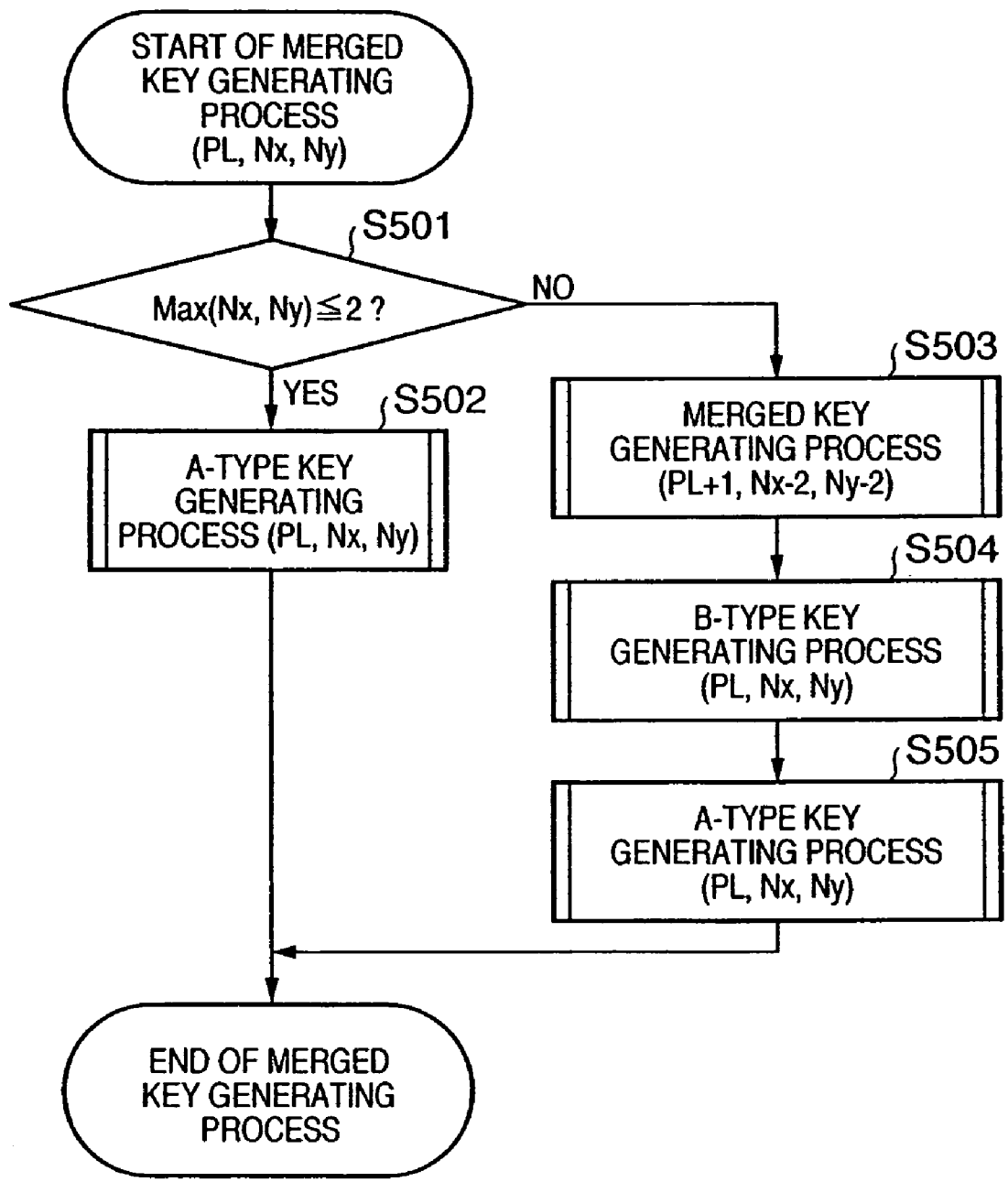
FIG. 17 is a flowchart of generating the merged key of the size of Nx*Ny according to the second embodiment of the present invention.

Next, the merged key generating process in the embodiments is explained below by referring to FIG. 17. FIG. 17 is a flowchart of the merged key generating process according to the embodiments.

As shown in FIG. 17, it is first determined in step S501 whether or not Max(Nx,Ny) is 2 or less. Max(a,b) is an operator for selection of a larger value between "a" and "b". When the value is 2 or less, control is passed to step S502. Otherwise, control is passed to S503.

In step S502, an A-type key matrix of the size Nx*Ny at the process level PL is generated. After the A-type key matrix is generated, the merged key generating process is terminated.

In step S503, a merged key matrix of the size (Nx−2)*(Ny−2) at the process level PL+1 is generated. Furthermore, after the merged key matrix is generated, a B-type key matrix of the size Nx*Ny at the process level PL is generated in step S504, thereby terminating the merged key generating process.

As described above, according to the embodiments, the merged key matrix of the size (Nx−2)*(Ny−2) at the process level PL is recursively generated in order to generate the merged key matrix of the size Nx*Ny at the process level PL. That is, using a merged key matrix of a smaller size, a merged key matrix of a larger size is sequentially generated.

Figure 18:
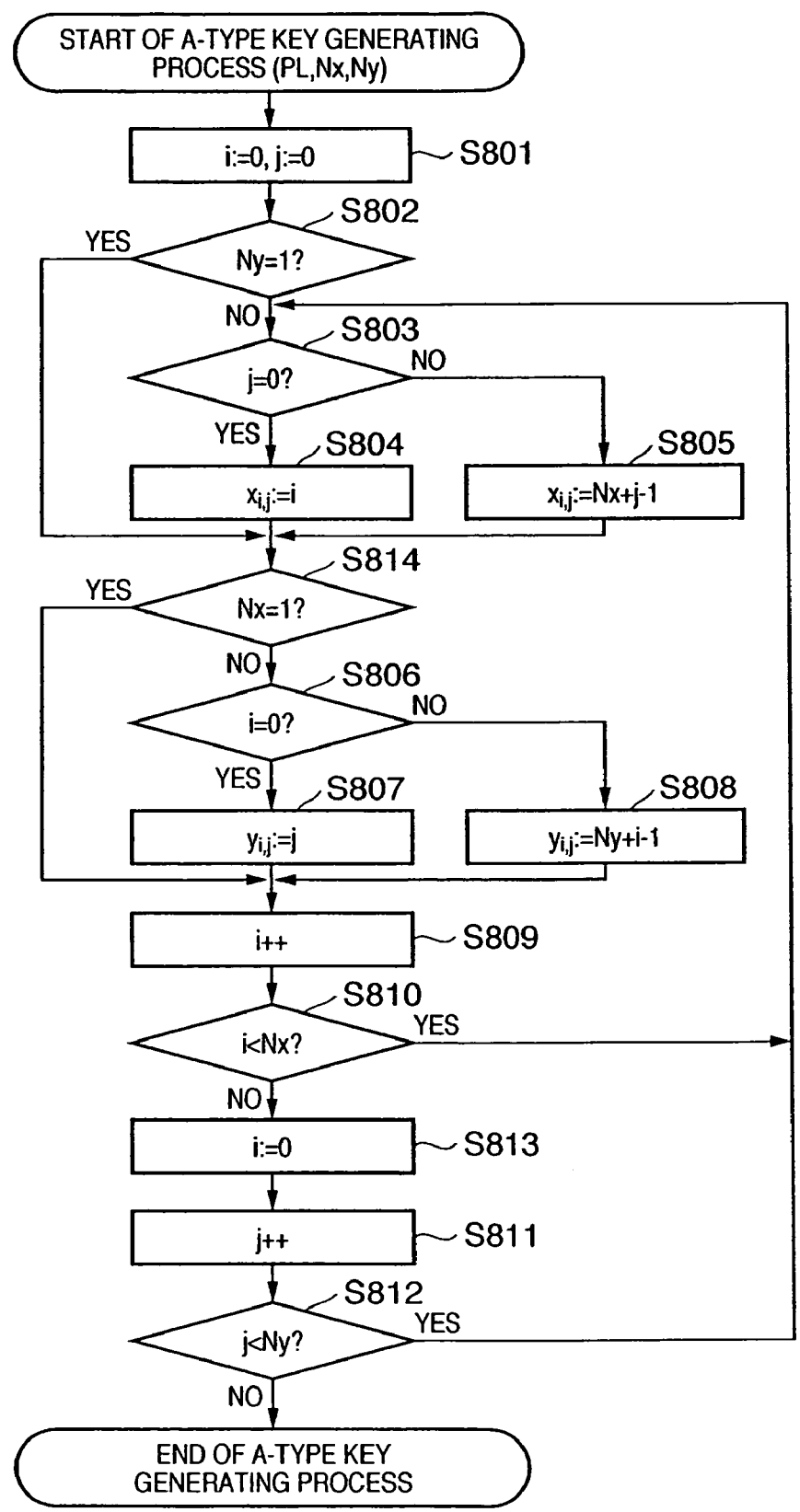
FIG. 18 is a flowchart of the procedure of generating an A-type key according to the second embodiment of the present invention.

Next, the method of generating an A-type key matrix is explained below by referring to the flowchart shown in FIG. 18.

First, in step S801, the variables i and j are set to 0. The variables i and j are indexes respectively indicating the coordinates in the horizontal and vertical directions.

In step S802, the value of the variable Ny is evaluated. If Ny is 1, control is passed to step S814. Otherwise, control is passed to step S803.

In step S803, the value of the variable j is evaluated. If j is 0, control is passed to step S804. Otherwise, control is passed to step S805. In step S804, the value i is substituted into the x key x_(i,j) of the cell (i,j). In step S805, the value Nx+j−i is substituted into the x key x_(i,j) of the cell (i,j). Then, control is passed to step S814.

In step S814, the value of the variable Nx is evaluated. If Nx is 1, control is passed to step S809. Otherwise, control is passed to step S806.

In step S806, the value of the variable i is evaluated. If i is 0, control is passed to step S807. Otherwise, control is passed to step S808. In step S807, the value j is substituted into the y key y_(i,j) of the cell (i,j). In step S808, the value Ny+i−1 is substituted into the y key y_(i,j) of the cell (i,j). Then, control is passed to step S809.

In step S809, the variable i is incremented by 1, and control is passed to step S810. Then, in step S810, the value of the variable i is evaluated. If i is smaller than Nx, control is passed to step S803. Otherwise, control is passed to S813, the variable i is initialized to 0, and control is passed to step S811.

In step S811, the variable j is incremented by 1, and control is passed to step S812. Then, in step S812, the value of the variable j is evaluated. If j is smaller than Ny, control is passed to step S803. Otherwise, the A-type key generating process is terminated.

Described above is the method of generating an A-type key matrix according to the embodiments. In the method explained above, when Nx=4 and Ny=4, the A-type key matrix described in 13A shown in FIG. 13 can be generated. When Nx=5 and Ny=5, the A-type key matrix described in 14A shown in FIG. 14 can similarly be generated.

Figure 19:
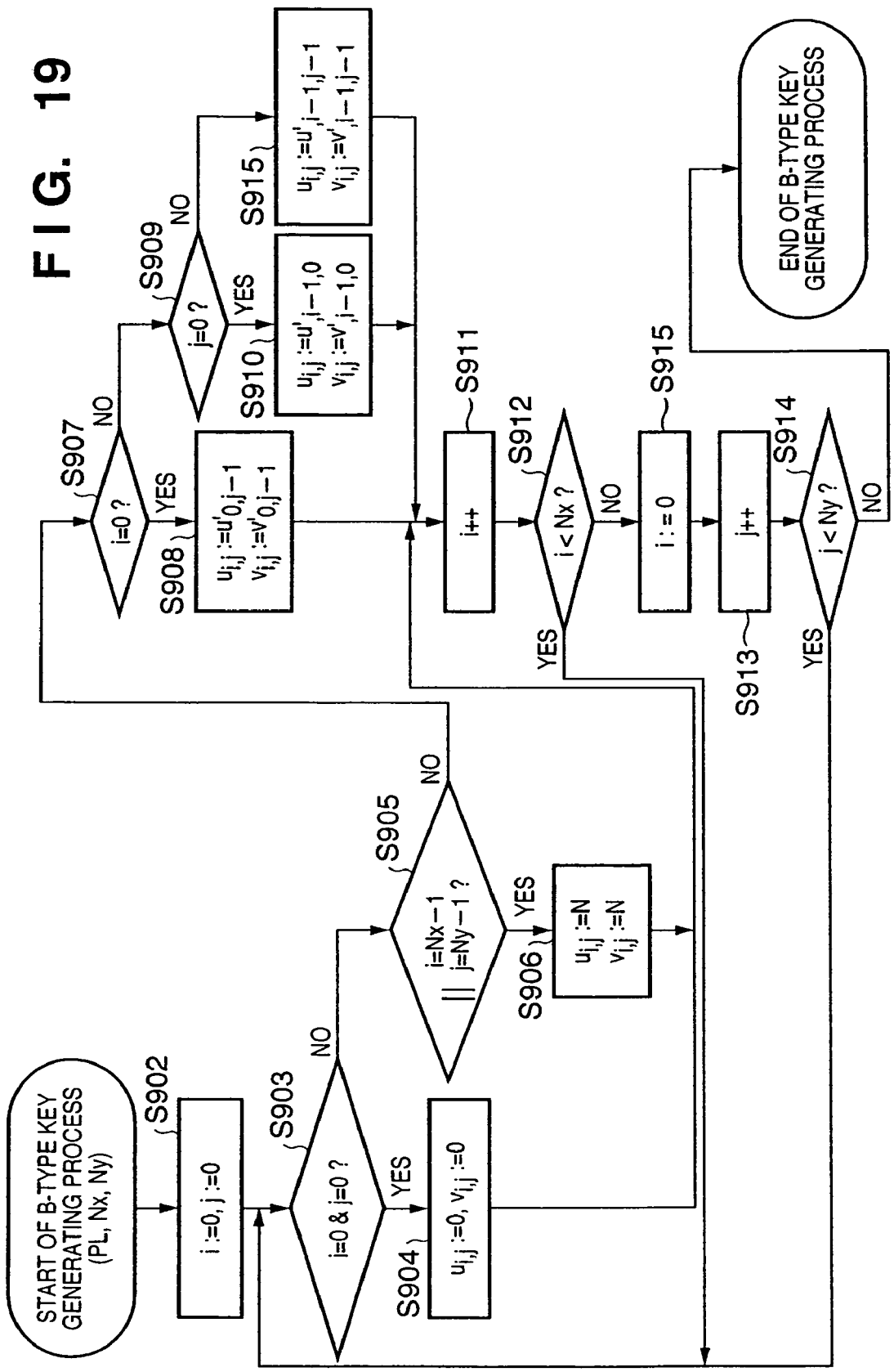
FIG. 19 is a flowchart of the procedure of generating a B-type key according to the second embodiment of the present invention.

Next, the method of generating a B-type key matrix is explained below by referring to the flowchart shown in FIG. 19. In step S902, the variables i and j are set to 0. The variables i and j are respectively the indexes indicating the coordinates in the horizontal and vertical directions.

In step S903, the variables i and j are evaluated. If both i and j are 0, control is passed to step S904. Otherwise, control is passed to step S905. In step S904, 0 is substituted into both the u key u_(i,j) of the cell (i,j) and the v key v_(i,j) of the cell (i,j). Then, control is passed to S911. When Nx=3, the u key u_(i,j) is not generated. When Ny=3, v key v_(i,j) is not generated.

In step S905, the variables i and j are evaluated. If i is Nx−1 or j is Ny−1, control is passed to step S906. Otherwise, control is passed to step S907. In step S906, "N" is substituted into both u key u_(i,j) of the cell (i,j) and the v key v_(i,j) of the cell (i,j). As described above, "N" is a symbol indicating that no key is set. Afterwards, control is passed to step S911. When Nx=3, the u key u_(i,j) is not generated. When Ny=3, the v key v_(i,j) is not generated.

In step S907, the value of the variable i is evaluated. If i is 0, control is passed to step S908. Otherwise, control is passed to step S909. In step S908, u'_(0,j−1) is substituted into the u key u_(i,j) of the cell (i,j), or v'_(0,j−1) is substituted into the v key v_(i,j) of the cell (i,j). In the description above, u' and v' indicate an A-type key at the process level is PL+1, that is, an A-type key whose matrix size is (Nx−2)*(Ny−2). An A-type key whose process level is PL+1 is generated in advance in the merged key generating process (in step S703 shown in FIG. 17) before the B-type key generating process (in step S704 shown in FIG. 7). Afterwards, control is passed to step S911. When Nx=3, the u key u_(i,j) is not generated. When Ny=3, the v key v_(i,j) is not generated.

In step S909, the value of the variable j is evaluated. If j is 0, control is passed to step S910. Otherwise, control is passed to step S915. In step S910, u'_(i−1,0) is substituted into the u key u_(i,j) of (i,j), and v'_(i−1,0) is substituted into the v key v_(i,j) of the cell (i,j). In step S915, u'_(i−1,j−1) is substituted into the u key u_(i,j) of the cell (i,j), and v'_(i−1,j−1) is substituted into the v key v_(i,j) of the cell (i,j). Afterwards, control is passed to step S911. When Nx=3, the u key u_(i,j) is not generated. When Ny=3, the v key v_(i,j) is not generated.

In step S911, the variable i is incremented by 1, and control is passed to step S912. In step S912, the value of the variable i is evaluated. If i is smaller than Nx, control is passed to step S903. Otherwise, control is passed to step S915, the variable i is initialized to 0, and control is passed to step S913.

In step S913, the variable j is incremented by 1, and control is passed to step S914. In step S914, the value of the variable j is evaluated. If j is smaller than Ny, control is passed to step S903. Otherwise, the B-type key generating process is terminated.

Described above is the method of generating a B-type key matrix according to the embodiments. In the method explained above, when Nx=4 and Ny=4, the B-type key matrix described in 13B in FIG. 13 can be generated. When Nx=5 and Ny=5, the B-type key matrix described in 14A in FIG. 14 can be similarly generated.

[Validity of the Generation of a Key]

The above-mentioned graph generating method is generated to satisfy the following conditions.

A node can generate only the key of its grandchild node.

According to the key information about a child node (unless a one-way function is weak), the key of a parent node cannot be generated.

Although two or more optional entities are combined, the key of an upper node to each entity cannot be generated.

Under the conditions, the hierarchical key management method capable of safely generating and delivering a key can be realized.

[Delivering a Key]

The method of delivering a key to each node by a root key deliverer (entity of a root node) and the method of delivering a key to a lower node by an entity holding an individual key other than the root key deliverer are separately described below. First, the root key deliverer safely generates the keys x, y, u, and v at random, and holds them as the individual keys of the root key deliverer. In the above-mentioned key generating procedure, plural keys are arranged to each node. The root key deliverer safely delivers the keys of each node to an entity positioned in each node. Additionally, by publishing the key delivery graphs as shown in FIGS. 13 and 14, the data identifying the position of a delivered key in a graph is delivered to each entity. The data can be constituted by, for example, a rank number in a tree structure, an intra-rank identification number indicating the ordinal position in the same rank, or the coordinates in a matrix.

Described below is the method of delivering a key by an entity holding an individual key other than the root key deliverer. Based on the individual key and the identification data indicating the position of a key in the key delivery graph, key data for a child node or a grandchild node is generated. For example, in 15A shown in FIG. 15, if there are x', y', u', and v' as a merged key, and it is the second in the rank 3 in the graph, it corresponds to [4,4,0,0]. The entity is $H^4(x)=H^0(H^4(x))= x'$, $H^5(y)=H^1(H^4(y))=H^1(y')$, $H(u)=H^1(H^0(u))=H^1(u')$, and $H^2(v)=H^2(H^0(v))=H^2(v')$ to the cell (2,1), that is, the child node as the second in the rank 4. Therefore, $H^4(x')$, $H(y')$, $H^1(u')$, and $H^2(v')$ can be delivered as a key of the cell (2,1). Similarly, it is obvious that a key can be generated for another child node and grandchild node.

[Key Generating/Delivering Process in the Information Processing Apparatus]

Described below is the procedure of the key generating/delivering process by the information processing apparatus 100. The data to be managed such as an image, etc. is selected from the data stored on the CD 108 or obtained through the network connection unit 107 of a network and stored on the HD 106, or already stored on the HD 106. The user selects the data using the mouse 112, the keyboard 113, etc. from the listing displayed on the monitor 102.

When the user selects the access control structure about, for example, how many layers are to be assigned to the data to be managed using a similar method, a calculation is performed according to the key generating graph depending on the structure using the CPU 103, and the result is stored in the RAM 105, the HD 106, etc.

Random data is generated from the data of, for example, the operation of the ROM 104, the RAM 105, the HD 106, or the mouse 112, plural original keys are generated using the random data, and the keys are stored on the RAM 105, the HD 106, etc. Furthermore, an individual key of each node in the key generating graph is calculated from an original key, and the result is stored in the RAM 105, the HD 106, etc.

The individual key stored on the RAM 105, the HD 106, etc. is read and delivered to another information processing device through the network connection unit 107 over a network.

[Hierarchical Access Structure Having Different Number of Levels for Each Hierarchical Axis]

FIGS. 13 and 14 shows only the examples in which Nx equals Ny (in FIG. 13, Nx=Ny=4, and in FIG. 14, Nx=Ny=5). Although Nx is different from Ny, a similar method can be used as shown in 20A in FIG. 20 for the A-type key, and in 20B in FIG. 20 for the B-type key. In FIG. 20, Nx=3, and Ny=4. However, the process can be normally performed according to the flowchart shown in FIGS. 18 and 19.

Third Embodiment of Generating and Managing a Key According to the Present Apparatus Described below is the third embodiment of the generation and management of a key by the apparatus described above.

[Summary of Generating a Key]

First, the generation of a node key of each node in the hierarchical key management method is explained below.

Figure 22:
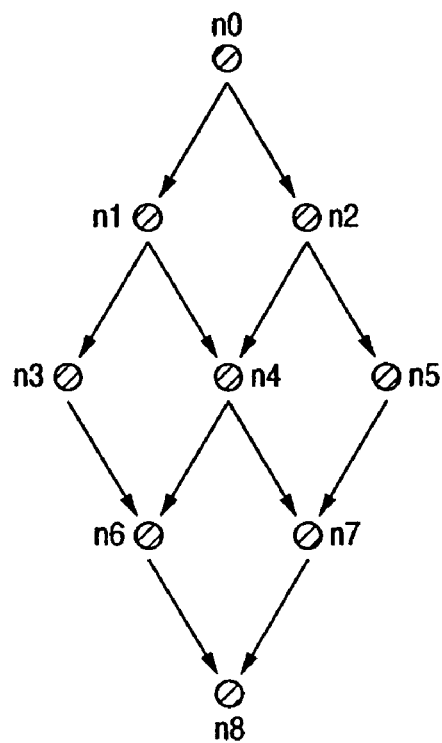
FIG. 22 shows the first example of a directed graph according to the third embodiment of the present invention.
Figure 41:
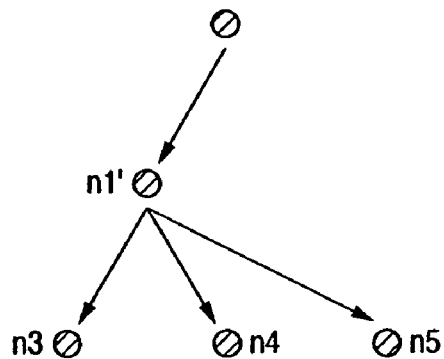
FIG. 41 shows an example of the directed graph which is shown in FIG. 40 according to the third embodiment of the present invention and is changed not to include a node having a connection relationship in both directions.

The present invention is based on the hierarchical relationship expressed by a directed graph having no loop and cycle as shown in FIGS. 22 and 32. As in the nodes n1 and n2 shown in FIG. 40, when there is a portion where plural different nodes are connected through a directed graph, these nodes are collectively processed as one node, thereby realizing the process when there is no node having the two-way connection. FIG. 41 is a directed graph in which n1 and n2 are regarded as one node n1'. Hereinafter, it is assumed that there is no node having the two-way connection.

Figure 4:
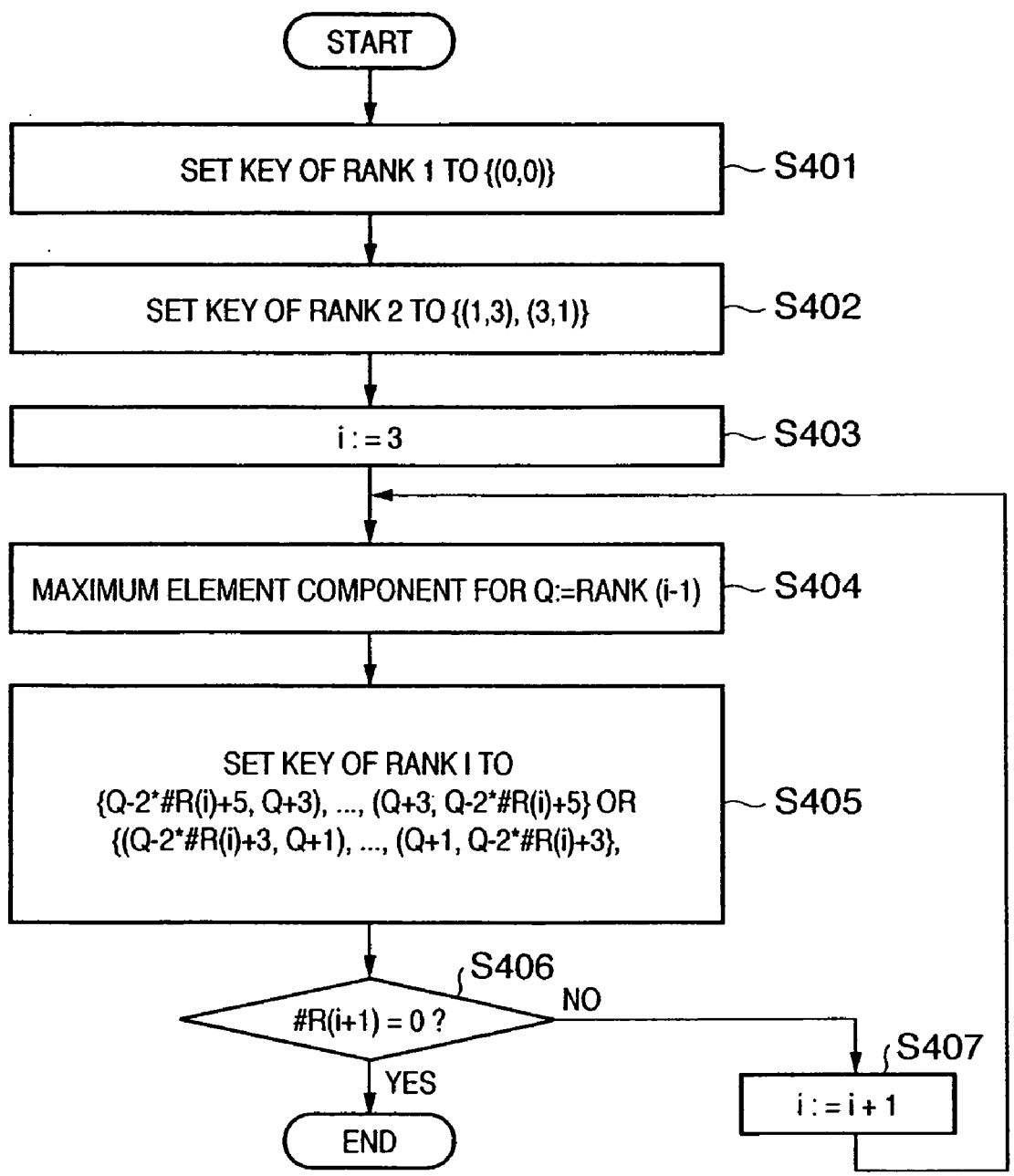
FIG. 4 is a flowchart of the procedure of generating an A-type key according to the first embodiment of the present invention.
Figure 23:
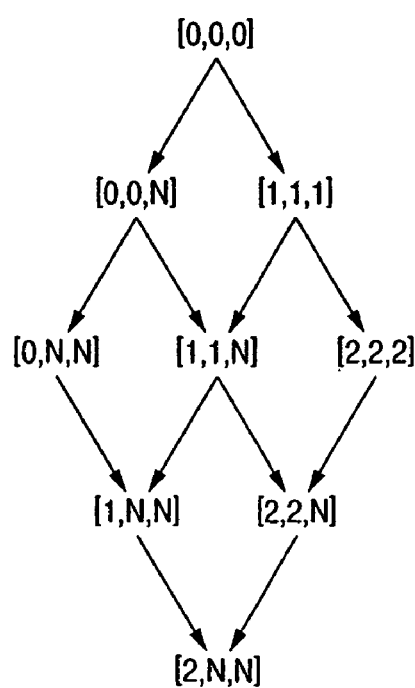
FIG. 23 shows the first example of a key generating graph according to the third embodiment of the present invention.
Figures 24, 25:
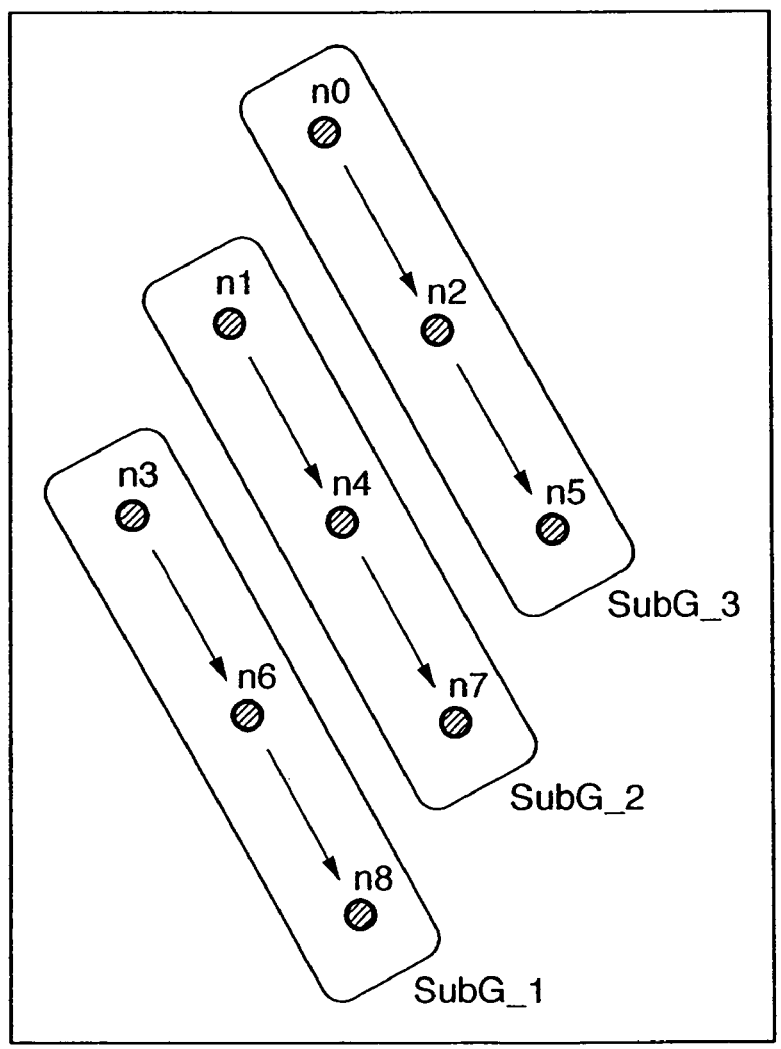
FIG. 24 shows the first example of a key delivery matrix according to the third embodiment of the present invention.
FIG. 25 is an explanatory view of the first example of dividing a node in the directed graph shown in FIG. 22 according to the third embodiment of the present invention.

For convenience in explanation, a grid graph having two hierarchical levels as shown in FIG. 22 is processed according to the embodiments. In FIGS. 23 and 24, the three numerals described in each cell express the number of times the hash function is performed on the three initial keys x, y, and z. For example, in the cell described with [2, 2, N], it is assumed that H(H(x)) and H(H(y)) are held as node keys. N indicates "none", and that there is no information about an initial key z. Hereinafter, when the hash arithmetic operation is performed n times, H^n( ) is described for short. In this notation, the cell described with [2,2,N] has two node keys H^2(x) and H^2(y). The tree structure in the hierarchical key management method can also be replaced it with the matrix as shown in FIG. 4. FIG. 23 shows an example of a tree structure having nine nodes. The numeral described in each node shown in FIG. 23 corresponds the numeral described in each cell shown in FIG. 24.

First, in the tree structure shown in FIG. 23, the root node (node expressed by [0,0,0] shown in FIG. 23) corresponds to the top right cell in the matrix. The left and right nodes in the child nodes in the nodes of the tree structure respectively correspond to the left and low cells in the matrix. The correspondence is sequentially defined for all nodes and cells, thereby replacing the tree structure shown in FIG. 23 with the matrix shown in FIG. 24.

Next, the method of generating key generating data shown in FIG. 23 or 24 is explained below.

[Dividing a Node]

To generate key generating data, a node is divided to satisfy the following conditions in a given key delivery graph G. In this process, the entire sets of a node is defined as Node (G), the size of a subset as N, and the divided subsets as SubG_1, SubG_2, . . . , SubG_N.

SubG_1 4 SubG_2 4 . . . 4 SubG_N=Node(G), that is, the entire subsets, cover the entire node.

n_a<n_b or n_a>n_b holds in two optional different nodes n_a and n_b contained in SubG_i. That is, the descendant relationship holds in n_a and n_b, and one is always a descendant node to another.

The number N of the divided subsets is referred to as a key delivery order of the key delivery graph G, and is expressed by Ord(G).

[Assigning a Node Key]

An initial key K_i is calculated for each subset SubG_i, and assigned as a node key of a root node. The descendant node subordinate to the root node is assigned a node key in the following rule.

a) Each node is assigned a number associated with N initial key K_i ($1 \leq i \leq N$). The number indicates the number of times the one-way function is performed on the initial key K_i, and "N" indicating "none" can also be assigned. When the number of the initial key K_i is "N", it indicates that a key relating to the initial key K_i is not held.

b) A node included in SubG_i is sorted in the descending order based on the descendant relationship in the directed graph in each set, and a number incremented by one from 0 is allocated. The number is associated with the initial key K_i.

c) The number associated with the initial key K_j ($i \neq j$) of the node included in SubG_i is N (none) when the node included in SubG_j (a subset for the initial key K_j) is not an ancestor node, and the number of the node as an ancestor node is the minimum value of the number assigned in the nodes included in the SubG_j.

Figure 31:
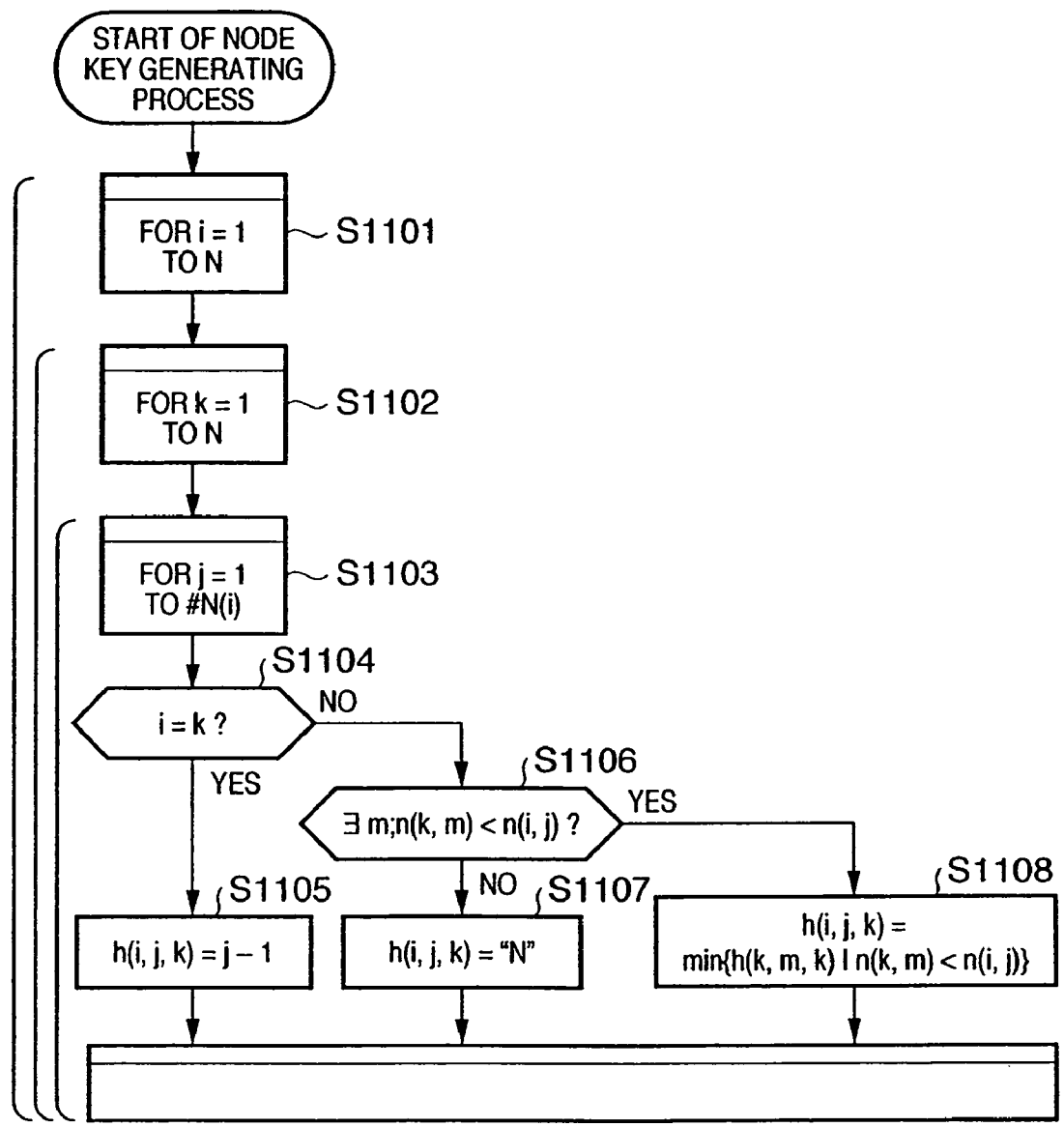
FIG. 31 is a flowchart of the node key generation step according to the third embodiment of the present invention.

FIG. 31 is a flowchart of the node key assigning process. The process shown in FIG. 31 is described below. In this process, all sets of nodes are assumed to be prime to one another, divided into non-blank subsets {SubG_i}($1 \leq i \leq N$), and the initial key K_i for each subset is calculated. The number of nodes included in the subsets SubG_i is described as #N(i), and the node included in the subset SubG_i is sorted in the descending order according to the descendant relationship in a directed graph, and is described as SubG_i={n(i,1), n(i,2), . . . , n(i, #N(i))}. Furthermore, the node key to the node n(i,j) is obtained by performing a predetermined number of times the one-way hash function on the initial key K_k ($1 \leq k \leq N$), and the predetermined number of times is expressed by h(i,j,k).

Step S1101 is a loop of a variable i from 1 to N. Step S1102 is a loop of a variable j from 1 to N. Step S1103 is a loop of a variable k from 1 to #N(i). In step S1104, an evaluation is made as to whether or not the variable i matches the variable k, control is passed to step S1105 if they match, and control is passed to step S1106 if they do not match. In step S1105, j−1 is substituted into h(i,j,k), thereby returning control to the loop process. In step S1106, an evaluation is made as to whether or not there is "m" which satisfies the condition that n(k,m)<n(i,j), that is, n(i,j) is an ancestor node of n(k,m). If there is no "m", control is passed to step S1107. If there is "m", control is passed to step S1108. In step S1107, "N" is substituted into h(i,j,k), thereby returning control to loop process.

In step S1108, min{h(k,m,k)|n(k,m)<n(i,j)} is substituted into n(i,j,k), that is, the minimum value of h(k,m,k) in the nodes as ancestor nodes having n(k,m) as n(i,j) is substituted, thereby returning control to the loop process.

A practical example is explained below by referring to FIGS. 25 to 28, FIGS. 29 to 30, and FIGS. 32 to 38.

FIG. 25 shows an example of dividing a node in the key generating graph shown in FIG. 22 into three subsets SubG_1 to SubG_3. That is, SubG_1={n0,n2,n5}, SubG_2={n1,n4, n7}, SubG_3={n3,n6,n8}. At this time, FIG. 26 shows only h(i,j,i). For example, {h(1,1,1), h(1,2,1), h(1,3,1)}={0, 1, 2}. This corresponds to steps S1104 and S1105. FIG. 27 shows the portion where "N" is held based on the descendant relationship of nodes. For example, h(1,1,3)="N". This is realized by the absence of "m" where n(3,m)<n(1,1)=n3. Actually, n(3,1)=n0, n(3,2)=n2, n(3,3)=n5, and the equations can be confirmed, which corresponds to steps 51106 and S1107. Furthermore, FIG. 28 shows the result of checking and reflecting all values "i,j" satisfying n(3,m)<n(i,j). For example, h(2,1,1)=0 indicates the possibility of m of 1, 2, and 3 to satisfy n(1,m)<n(2,1)=n1. The value of 0 as the minimum value satisfying h(1,1,1)=0,h(1,2,1)=1,h(1,3,1)=2 is selected. All values "i,j" satisfying n(2,m)<n(i,j) are checked, and finally FIG. 24 is obtained.

Figures 29, 30:
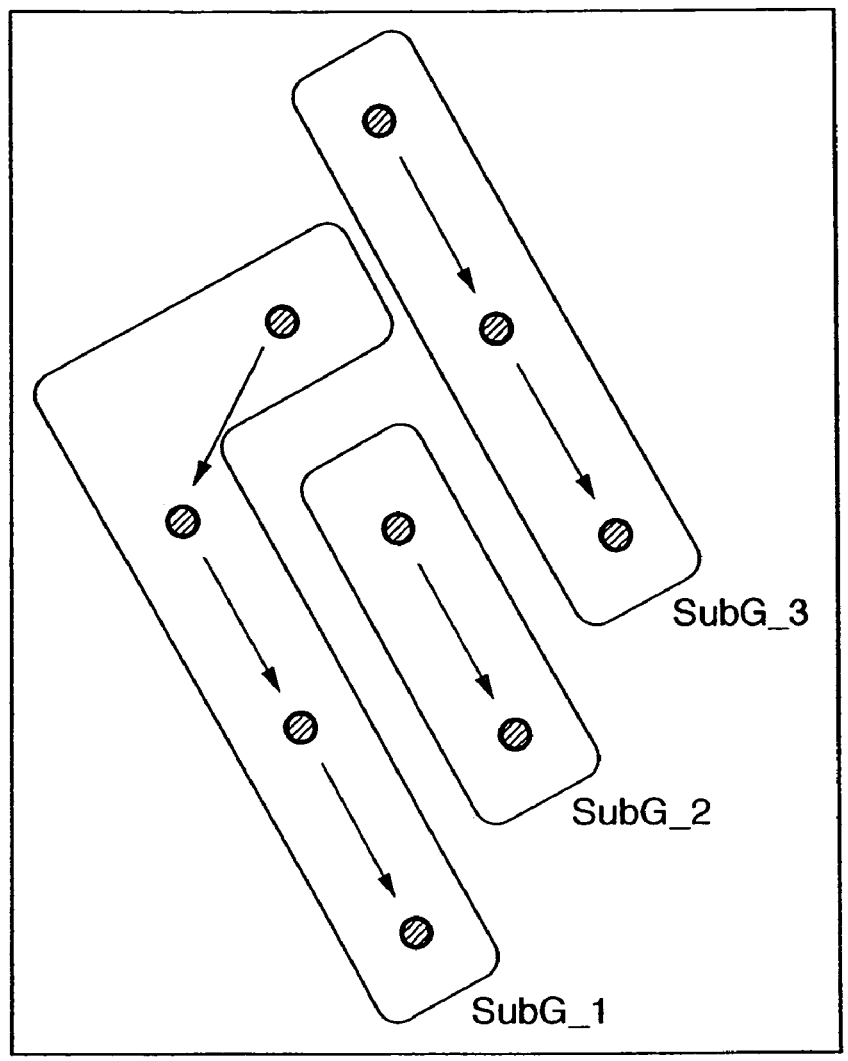
FIG. 29 is an explanatory view of the second example of dividing a node in the directed graph shown in FIG. 22 according to the third embodiment of the present invention.
FIG. 30 shows the second example of a key delivery matrix according to the third embodiment of the present invention.

The constituting method by dividing a node shown in FIG. 29 which is different from the method shown in FIG. 25 can be similarly configured as in FIG. 24 according to the flowchart shown in FIG. 31, and FIG. 30 is obtained. Between FIGS. 24 and 30, FIG. 30 indicates a larger amount of total hash arithmetic operation.

The method of constituting a node key according to the key generating graph shown in FIG. 32 is explained below.

Figure 34:
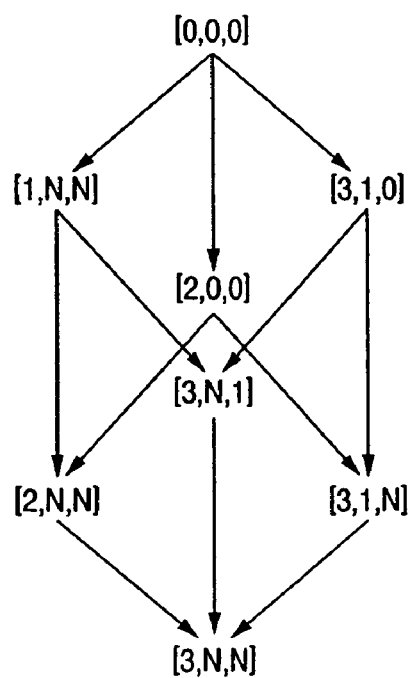
FIG. 34 shows the second example of a key generating graph according to the third embodiment of the present invention.
Figure 35:
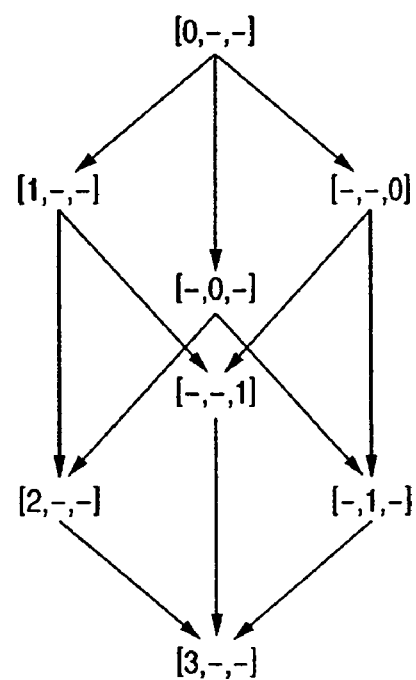
FIG. 35 shows the key delivery matrix showing the in-progress status of constituting a key delivery matrix according to the third embodiment of the present invention.
Figure 36:
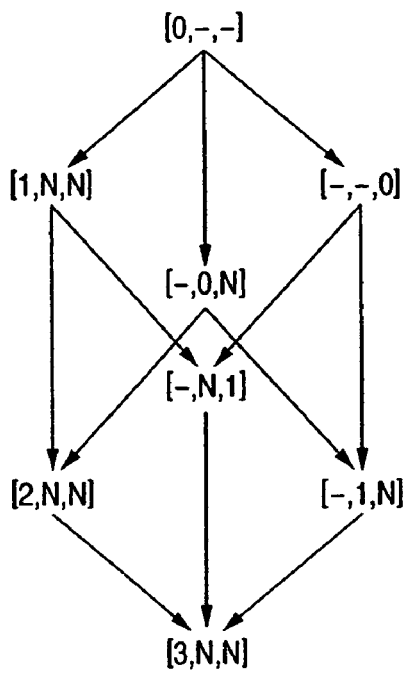
FIG. 36 shows the key delivery matrix showing the in-progress status of constituting a key delivery matrix according to the third embodiment of the present invention.
Figure 37:
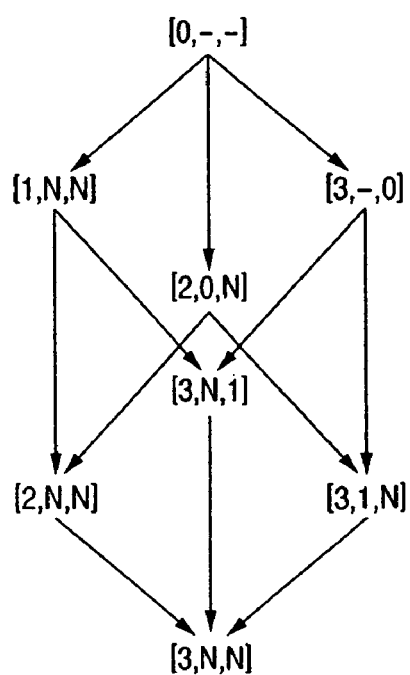
FIG. 37 shows the key delivery matrix showing the in-progress status of constituting a key delivery matrix according to the third embodiment of the present invention.

FIG. 33 shows an example of dividing a node in the key generating graph shown in FIG. 32 into three subsets SubG_1 to SubG_3. That is, SubG_1={n0,n1,n4,n7}, SubG_2={n3,n6}, SubG_3={n2,n5}. At this time, the node key constituted according to the flowchart shown in FIG. 31 is shown in FIG. 34. The configuration up to that shown in FIG. 34 is explained below. First, FIG. 35 shows the display of only h(i,j,i). For example, {h(1,1,1), h(1,2,1), h(1,3,1), h(1,4,1)}={0,1,2,3}. This corresponds to steps S1104 and S1105. FIG. 36 shows the portion where "N" is held based on the descendant relationship of nodes. For example, h(1,2,3)="N". This is realized by the absence of "m" where n(3,m)<n(1,2)=n1. Actually, n(3,1)=n3, n(3,2)=n6, and the equations can be confirmed, which corresponds to steps S1106 and S1107. Furthermore, FIG. 37 shows the result of checking all values "i,j" satisfying n(1,m)<n(i,j). For example, h(2,1,1)-2 indicates the possibility of m of 3 and 4 to satisfy n(1,m)<n(2,1)=n3. The value of 2 as the minimum value satisfying h(1,3,1)=2,h(1,4,1)=3 is selected. Similarly, all values "i,j" satisfying n(2,m)<n(i,j) are checked, FIG. 38 shows the reflected result, and finally FIG. 34 is obtained.

The case in which a key is not delivered to the terminal node is considered. In this case, a status in which data such as thumbnail images, etc, in the image data can be accessed without a restriction can be generated. FIG. 39 shows an example, and the terminal node has no node key as described with [N,N,N]. This can be obtained by applying only the terminal node to the flowchart shown in FIG. 31 from the status not included in any subset during the node dividing operation n. In this example, a node key is not delivered only to one terminal node, but a similar configuration can be realized when plural nodes are included.

[Condition to be Satisfied by a Generated Key]

The above-mentioned key generating method is constituted to satisfy the following conditions.

a. Possibility of generation: A target node has to generate a key of its grandchild node.

b. Possibility of avoiding collusion attack: (so far as a one-way function does not become weak) Although two or more entities positioned in optional nodes are conspired, the key of an ancestor node in the upper node to each node cannot be generated.

Under these conditions, the hierarchical key management method capable of safely generating and delivering a key can be realized.

[Delivering a Key]

The method of delivering a key to each node by a root key deliverer (entity of a root node) and a method of delivering a key to a lower node by an entity holding an individual key other than the root key deliverer are individually described below. First, the root key deliverer safely generates at random Ord(G) parameters $(x\_i)(1 \leq i \leq Ord(G))$ of the key delivery order according to the key delivery graph G, and defines them as individual keys of the root key deliverer. In the above-mentioned key generating procedure, plural keys are arranged in each node. The root key deliverer safely delivers a key for each node to the entity positioned in each node. It also publishes a key delivery graph, and delivers to each entity the data identifying the position of the delivered key. The data, for example, can be constituted based on the coordinates when a matrix is expressed if a grid graph is defined as a key delivery graph.

[Key Generating/Delivering Process in Information Processing Apparatus]

Described below is procedure of the key generating/delivering process performed by the information processing apparatus 100. The data to be managed such as an image, etc. is selected from the data obtained through the CD 108 or the network connection unit 107 of the network or selected from the data already stored on the HD 106. The user selects the data using the mouse 112, the keyboard 113, etc. from the listing displayed on the monitor 102.

When the user selects the access control structure about, for example, how many layers are to be assigned to the data to be managed using a similar method, a calculation is performed according to the key generating graph depending on the structure using the CPU 103, and the result is stored in the RAM 105, the HD 106, etc.

Random data is generated from the data of, for example, the operation of the ROM 104, the RAM 105, the HD 106, or the mouse 112, plural original keys are generated using the random data, and the keys are stored on the RAM 105, the HD 106, etc. Furthermore, an individual key of each node in the key generating graph is calculated from an original key, and the result is stored in the RAM 105, the HD 106, etc.

The individual key stored on the RAM 105, the HD 106, etc. is read and delivered to another information processing device through the network connection unit 107 over a network.

Practical Example of the Hierarchical Access Structure According to the Embodiments A preferred embodiment of the access control using the key data having a hierarchical structure generated in the key delivery method according to the first and third embodiments is explained.

Figure 42:
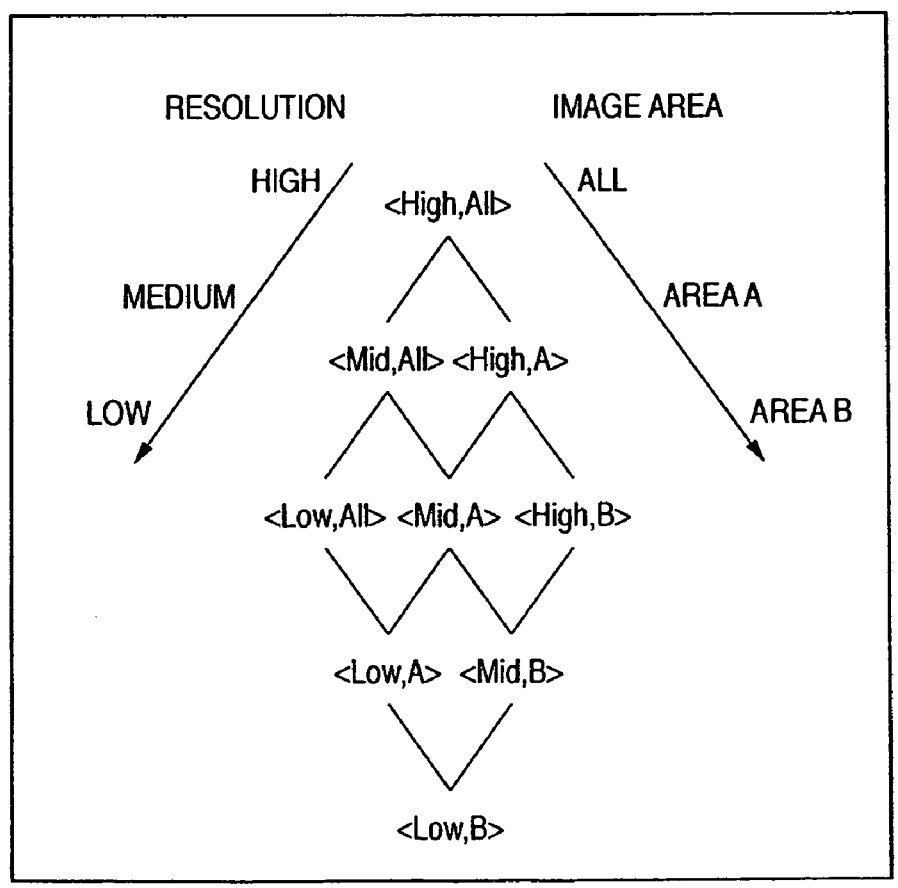
FIG. 42 shows the concept for explanation of the hierarchical access structure according to the embodiments.
Figure 47:
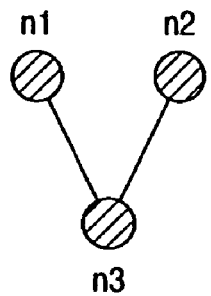
FIG. 47 shows the concept for explanation of the local structure in the hierarchical access control method.
Figure 48:
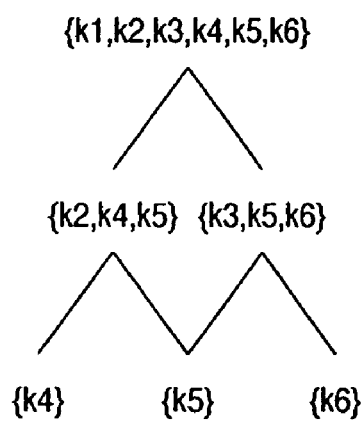
FIG. 48 is an explanatory view of an example of the user multiple keying.
Figure 49:
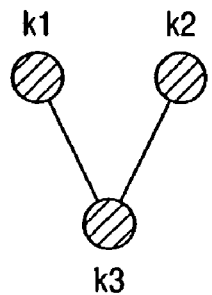
FIG. 49 is an explanatory view of the one-way function based keying schemes.

The key generating graph shown in FIGS. 2, 3, and 15 has two hierarchical axes. One (lower left) of the axes indicating the resolution and another (lower right) indicating the image area are shown in FIG. 42. The resolution has three levels, that is, high, middle, and low levels, and indicates the resolution of an image that can be acquired. The image area also has three levels, and the right to browse all areas, subareas A, subareas B (smaller than subareas A) is permitted. At this time, the node assigned the highest right and positioned at the root is provided with "resolution=high, and image area=all", and the lowest node is provided with "resolution=low, and image area=area B".

Example of a Practical Application of the First Embodiment

The key delivery method and the image encryption method are explained by referring to the case in which a key is delivered as shown in FIG. 10. Relating to the target image data IMG, the image data of the area B is defined as IMG1, the difference data of the area A is defined as IMG_2, and the difference data for acquisition of all image data is defined as IMG_3. That is, IMG=IMG_1+IMG_2+IMG_3. Each IMG_i has the low resolution data as IMG_i(L), the difference data of the medium resolution as IMG_i(M), and the difference data of the high resolution as IMG_i(H). That is, IMG_i=IMG_i(L)+IMG_i(M)+IMG_i(H).

First, the root key deliverer generates original keys x, y, and z at random. A key for encryption is defined as a Key(<High, All>):=H(x||y||z). Using the key, IMG_3(H) is encrypted. In the expression, || indicates coupled data. In each child node, three pieces of obtained data are coupled as with the root node, an encryption key is generated, and the data shown in FIG. 43 is encrypted.

For example, in a <Mid, All> node, H(x), H^2(y), z is provided as key data. However, using an encryption key Key (<Mid, All>):=H(H(x)||H^2(y)||z), IMG_3(M) is encrypted. When the encrypted data is decoded, a similar process is performed an encryption key is calculated, a decoding process is performed, and appropriate image data is acquired.

Example of a Practical Application of the Second Embodiment

Figure 21:
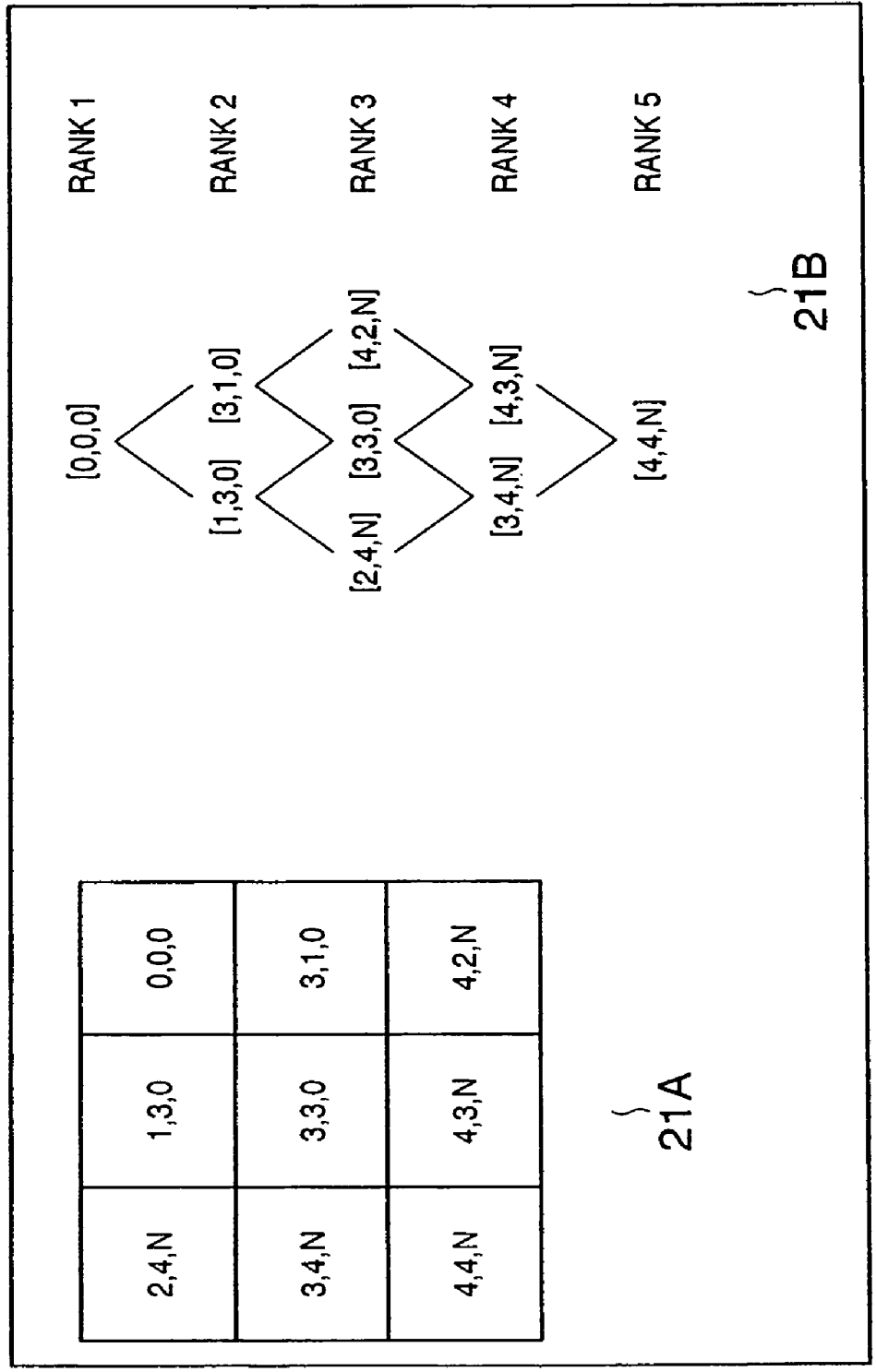
FIG. 21 shows the third example of a key generating graph according to the second embodiment of the present invention.

The key delivery method and the image encrypting method are explained below by referring to the case in which a key is delivered as shown in FIG. 21. FIG. 21 shows an example of an A-type key (21A in FIG. 21) and a B-type key (21B in FIG. 21) when Nx=3 and Ny=3. The target image data IMG includes the image data IMG1 in the area B, the difference data IMG_2 in the area A, and the difference data IMG_3 for obtaining all image data. That is, IMG=IMG_1+IMG_2+IMG_3. Each IMG_i includes the low resolution data IMG_i(L), the medium resolution data IMG_i(M), and the high resolution difference data IMG_i(H). That is, IMG_i=IMG_i(L)+IMG_i(M)+IMG_i(H).

The root key deliverer generates original keys x, y, and u at random. Using the key Key (<High, All>):=H(x||y||u) for encryption, the IMG_3(H) is encrypted. In the expression, || indicates coupled data. In each child node, three pieces of obtained data are coupled as with the root node, an encryption key is generated, and the data shown in FIG. 43 is encrypted.

For example, in a <Mid, All> node, H(x), H^3(y), u is provided as key data. However, using an encryption key Key (<Mid, All>):=H(H(x)||H^3(y)||u), IMG_3(M) is encrypted. When the encrypted data is decoded, a similar process is performed, an encryption key is calculated, a decoding process is performed, and appropriate image data is acquired.

Example of a Practical Application of the Third Embodiment

The key delivery method and the image encrypting method are explained below by referring to the case in which a key is delivered as shown in FIG. 23 or 24. The target image data IMG includes the image data IMG1 in the area B, the difference data IMG_2 in the area A, and the difference data IMG_3 for obtaining all image data. That is, IMG=IMG_1+IMG_2+IMG_3. Each IMG_i includes the low resolution data IMG_i(L), the medium resolution data IMG_i(M), and the high resolution difference data IMG_i(H). That is, IMG_i=IMG_i(L)+IMG_i(M)+IMG_i(H).

The root key deliverer generates original keys x, y, and u at random. Using the key Key (<High, All>):=H(x||y||u) for encryption, the IMG_3(H) is encrypted. In the expression, || indicates coupled data. In each child node, three pieces of obtained data are coupled as with the root node, an encryption key is generated, and the data shown in FIG. 43 is encrypted.

For example, in a <Mid, All> node, H(x), H^3(y), u is provided as key data. However, using an encryption key Key (<Mid, All>):=H(H(x)||H^3(y)||u), IMG_3(M) is encrypted. When the encrypted data is decoded, a similar process is performed, an encryption key is calculated, a decoding process is performed, and appropriate image data is acquired.

According to the embodiments, keys are coupled and hashed as a method of generating an encryption key. However, other key coupling methods (method of calculating a key from plural pieces of key data) can also be applied.

In the embodiments, the resolution and image areas are used as hierarchical axes. However, the present invention is not limited to this application, but two or more optional hierarchical levels can be selected from among the hierarchical levels as image quality, a time axis, use control information, etc. to be access controlled and used as axes.

Other Embodiments by Software, etc.

The present invention can also be applied as a part of the system constituted by plural pieces of equipment (for example, a host computer, interface equipment, a reader, a printer, etc.), or can be applied as a part of a piece of equipment (for example, a copying machine, a facsimile device).

The present invention is not limited to a method of an apparatus and a method for realizing the above-mentioned embodiments or a method of combining the methods explained in the above-mentioned embodiment, but realizing the above-mentioned embodiments by providing a program code of software for realizing the above-mentioned embodiments to a computer (CPU or MPU) in the system or the apparatus, and by the computer of the system or the apparatus operating various devices described above according to the program code can be included in the scope of the present invention.

In this case, the program code of the software realizes the function of the above-mentioned embodiments, and the program code itself and means for providing the program code for the computer, that is, the storage medium storing the program code, can be included in the scope of the present invention.

As a storage medium storing the program code can be, for example, a floppy (R) disk, a hard disk, an optical disk, a magneto optical disk. CD-ROM, magnetic tape, a nonvolatile memory card, ROM, etc. can be used.

By the computer controlling various devices according to the provided program code only, the program code can be included in the present invention not only in the case where the functions of the above-mentioned embodiments are realized, but also in the case where the embodiments is realized by the OS (operating system) operated in the computer or by the cooperation of the program code with other application software, etc.

Furthermore, when the CPU, etc. provided in a function expansion board or a function storage unit performs a part or all of the actual process according to an instruction of the program code after the provided program code is stored in the memory in the function expansion board of a computer and a function expansion unit connected to the computer, and the above-mentioned embodiments are realized, it can be included in the embodiments.

As described above, in the contents deliver system and the removable medium control method in which plural keys for decoding are to be managed according to the present invention, the method of reducing the load on the key management can be provided by reducing the amount of computation in a key generation.

The present invention is not limited to the above-mentioned embodiments, but can also be applied to various changes and variations without the spirit and scope of the present invention. Therefore, the scope of the present invention can be published by adding the following claims.

The invention claimed is:

1. A key information processing method performed by a computer, said method comprising:
    a setting step of setting a set of the number of execution times of a one-way function for each of elements having a hierarchical relationship;
    a key generation step of generating two or more individual keys for each element as a value obtained by executing the one-way function for each of two or more original keys depending on corresponding execution times in a set of the number of execution rules times set for the element; and
    a key delivery step of delivering the two individual keys for each element to the element.

2. The key information processing method according to claim 1, wherein in the key generation step, an individual key for an uppermost element can be set as the two or more original keys.

3. The key information processing method according to claim 1, wherein in the key generation step, an uppermost element generates two or more individual keys for each of the elements from the two or more original keys, and in the key delivery step, the uppermost element delivers to each element the two or more individual keys for the element.

4. The key information processing method according to claim 1, wherein in the key generation step, an element other than an uppermost element generates two or more individual keys for a lower element from two or more individual keys for the element, and in the key delivery step, an element other than the uppermost element delivers to the lower elements two or more individual keys to the lower elements.

5. The key information processing method according to claim 1, wherein in the key generation step, two or more individual keys are generated for the lower elements by executing the one-way function a number of times corresponding to a difference between a set of a number of execution times set for an element other than the uppermost element and a set of a number of execution times set for the lowermost element on each of two or more individual keys of elements other than the uppermost element.

6. The key information processing method according to claim 5, further comprising:
    a publishing step of publishing a graph showing setting contents of the setting step to each of the elements; and
    an identification data delivering step of delivering identification data indicating a position of the element on the graph to each of the elements.

7. The key information processing method according to claim 1, wherein in the setting step, in the case where a rank number of an uppermost level is defined as 1, and the rank numbers of subsequent levels are sequentially incremented by 1,
    $\{(0,0)\}$ is set as the set of the execution number of times on an element having the rank number of 1;
    $\{(1,3), (3,1)\}$ is set as the set of the execution number of times on an element having the rank number of 2; and
    as the set of a number of execution times on each element of a rank number i ($i \geq 3$), in the case where a maximum element component of a rank number (i−1) is Q, and a number of nodes of a rank i is #R(i), $\{(Q−2*\#R(i)+5, Q+3), (Q−2*\#R(i)+7, Q+1), \ldots, (Q+3, Q−2*\#R(i)+7)\}$ is set when #R(i)>#R(i−1), and $\{(Q−2*\#R(i)+3, Q+1), (Q−2*\#R(i)+7, Q−1), \ldots, (Q+3, Q−2*\#R(i)+3)\}$ is set when #R(i)<#R(i−1).

8. The key information processing method according to claim 6, wherein in the setting step, when #R(i)<#R(i−1) is satisfied for each element of a rank number i($i \geq 3$), in place of $\{(Q−2*\#R(i)+3, Q+1), (Q−2*\#R(i)+5, Q−1), \ldots, (Q+1, Q−2*\#R(i)+3)\}$,
    $\{(Q−3, Q), (Q−1, Q+2), (Q, Q+3)\}$ is set when #R(i)=3;
    $\{(Q−1, Q), (Q, Q−1)\}$ is set when #R(i)=2; and
    $\{(Q, Q)\}$ is set when #R(i)=1.

9. The key information processing method according to claim 1, wherein in the setting step, when an upper right cell in a matrix is an origin (0, 0), x coordinates increases by 1 in a horizontal direction, y coordinates increases by 1 in a vertical direction, and a set (x_ij, y_ij) of the number of the execution times on a cell of the coordinates (i,j) of a matrix of a size Nx*Ny,
    x_ij=1 is set when j=0;
    x_ij=Nx+i−1 is set when j≠0;
    y_ij=j is set when i=0; and
    y_ij=Ny+j−i is set when j≠0.

10. The key information processing method according to claim 1, when there is a grid-shaped hierarchical relationship having two hierarchical axes for the plural elements, further comprising:
    a second key generation step of generating a third individual key for an element having a plurality of parent elements in an upper hierarchical level; and
    a second key delivery step of delivering a third individual key for an element having the plurality of parent elements.

11. The key information processing method according to claim 10, wherein in the second key generation step, the third individual key is generated by performing a one-way function a predetermined number of times on data shared in the hierarchical level of the plurality of parent elements.

12. The key information processing method according to claim 10, further comprising a second setting step of setting a set of a number of times the one-way function is executed on each element of a same hierarchical level as an element having the plurality of parent elements, wherein in the second key generation step, a result of executing the one-way function a respective number of times on data shared by the plurality of parent elements as the third individual key for each element of the same hierarchical level.

13. The key information processing method according to claim 12, wherein in the second setting step, in the case where a rank number of an uppermost level is 1, rank numbers of subsequent hierarchical levels are sequentially increased by 1, and a number of node of a rank number i is #R(i),
    the number of times is not set for each element in a hierarchical level of the rank number i satisfying #R(i)<3; and
    $\{(1,\ldots,1), (0,1,\ldots,1), (1,0,\ldots,1), \ldots, (1,\ldots,1,0), (1,\ldots,1)\}$ is set as the number of times for each element of the hierarchical level of the rank number i satisfying #R(i)≥3.

14. The key information processing method according to claim 12, wherein in the second setting step, in the case where an upper right cell in a matrix is an origin (0,0), x coordinates increases by 1 in a horizontal direction, y coordinates increases by 1 in a vertical direction, and a set (U'_i'j', v'_i'j') of the number of the execution times on a cell of the coordinates (i',j') of a matrix of a size (Nx−2)*(Ny−2),
    as a set (u_ij, v_ij) of the number of the execution times on a cell of the coordinates (i,j) of a matrix of a size Nx*Ny,
    u_ij=0, and V_ij=0 when i=0, and j=0;
    u_ij and v_ij are the information that there is no individual key is indicated when i=Nx−1 or j=Ny−1;
    u_ij=u'_i(j−1), and v_ij=v'_i(j−1) when i=0 and j≠0;
    u_ij=u'_(i−1)j; and v_ij=v'_i(j−1) when j=0 and j≠0; and in other cases, u_ij=u'_(i−1)(j−1), and v_ij=v'_(i−1)(j−1), and a set of a number of times each cell executed in a matrix of the size of (Nx−2)*(Ny−2) is generated wherein in the setting step, when an upper right cell in a matrix is an origin (0,0), x coordinates increases by 1 in a horizontal direction, y coordinates increases by 1 in a vertical direction, and a set (x_ij, y_ij) of the number of the execution times on a cell of the coordinates (i,j) of a matrix of a size Nx*Ny, x_ij=1 is set when j=0;

x_ij=Nx+i−1 is set when j'0;

y_ij=j is set when i=0; and y_ij=Ny+j−1 is set when j'0.

15. The key information processing method according to claim 10, wherein data shared among the plurality of parent elements is generated using the two original keys.

16. The key information processing method according to claim 10 wherein data shared among the plurality of parent elements is generated from a third original key independent of the two original keys.

17. The key information processing method according to claim 10, wherein the two hierarchical axes are associated with hierarchical levels of two parameters of an image, and an individual key of each element enables an image corresponding to an hierarchical level to which the element belongs to be accessed relating to the two parameters.

18. The key information processing method according to claim 17, wherein the two parameters are an image area and a resolution.

19. The key information processing method according to claim 17, wherein the two parameters are quality of an image and a resolution.

20. The key information processing method according to claim 19, wherein the image is a moving picture, and the two parameters are a time area of and image quality of a moving picture.

21. A key information processing apparatus, comprising:

setting means for setting a set of the number of execution times of a one-way function for each of the elements having a hierarchical relationship;

key generation means for generating two or more individual keys for each element as the value obtained by executing the one-way function for each of two or more original keys depending on corresponding execution times in a set of the number of execution times set for the element; and key delivery means for delivering the two individual keys for the elements to each element.

22. A computer-readable storage medium storing a computer program used to direct a computer to execute a key information processing method, the method comprising:

a setting step of setting a set of the number of execution times of a one-way function for each of elements having a hierarchical relationship;

a key generation step of generating two or more individual keys for each element as a value obtained by executing the one-way function for each of two or more original keys depending on corresponding execution times in a set of the number of execution times set for the element; and a key delivery step of delivering the two individual keys for the elements to each element.

23. A key information processing method performed by a computer for delivering a key by generating a key at each node from a parent node according to a hierarchical relationship expressed in a directed graph having no cycle, the method comprising:

an initial key generating step of calculating N keys in a root node positioned as a most significant node;

a node key generating step of generating a value of a one-way function is executed a number of predetermined times depending on execution rules for M keys (M£N) among N initial keys in each node, as M node keys for the node; and a key delivery step of delivering a node key from each of the nodes to a descendant node.

24. The key information processing method according to claim 23, wherein when the directed graph includes a portion where a plurality of difference nodes are connected through a directed graph, the nodes are collectively processed as one node.

25. The key information processing method according to claim 23, further comprising a number-of-initial key calculation step of calculating a number N of initial keys from a structure of the directed graph.

26. The key information processing method according to claim 23, further comprising:

a node dividing step of generating a set of subset of nodes to cover all nodes in the number-of initial key calculation step;

a step of checking that the subset satisfies a descendant relationship of any node included in the same subset; and a number-of-initial key calculation step of setting a number N of the initial keys as a size of a set of the subsets.

27. The key information processing method according to claim 26, wherein in the node dividing step, all nodes are divided into subsets prime to one another.

28. The key information processing method according to claim 23, wherein:

the execution rules comprise:

an initial key associating step of associating different initial keys for each set of subsets obtained in the node dividing step;

a numbering step of sorting the subset in a descending order in each set on the directed graph, and allocating a number one by one from 0, and the numbered value indicates a number of times a one-way function is executed for the initial key.

29. The key information processing method according to claim 28, wherein when the number (number of times the one-way function is executed) is allocated to a node included in another subset not associated with an initial key K in the initial key associating step, the number of a node which is not an ancestor node of a node included in a subset G associated with the initial key K is defined as N (none), and the number of a node which is an ancestor node defined as a minimum value of a number allocated in nodes included in the subset G as a descendant node.

30. The key information processing method according to claim 23, wherein in the node key generation step, a node key is not delivered to a lowermost node.

31. The key information processing method according to claim 30, wherein in the node key generation step, a node key is not delivered to a descendant node of a plurality of specified nodes.

32. The key information processing method according to claim 30, wherein in the node dividing step, a node to which a node key is not delivered is not included in the subset.

33. The key information processing method according to claim 23, wherein the directed graph is a grid node showing a grid-shaped hierarchical relationship having two hierarchical axes.

34. The key information processing method according to claim 23, further comprising:
a publishing step of publishing node key setting data indicating setting contents of the node key setting step to each of the nodes; and
an identification data delivering step of delivering identification data indicating a position on the node key setting data of the node to each of the nodes.

35. The key information processing method according to claim 34, wherein the two hierarchical axes are associated with the hierarchical levels of two parameters of an image, and an individual key of each element enables an image corresponding to an hierarchical level to which the element belongs to be accessed relating to the two parameters.

36. The key information processing method according to claim 35, wherein the two parameters are an area of an image and a resolution.

37. The key information processing method according to claim 35, wherein the two parameters are quality of an image and a resolution.

38. The key information processing method according to claim 35, wherein the image is a moving picture, and the two parameters are a time area of and image quality of a moving picture.

39. The key information processing method according to claim 23, wherein in the initial key generation step, the N initial keys are generated from one original key.

40. The key information processing method according to claim 39, wherein in the initial key generation step, the N initial keys are calculated using a one-way function from the original key.

41. A key information processing apparatus for generating a key at each node from a parent node according to the hierarchical relationship expressed in a directed graph having no cycle includes:
initial key generation means for calculating N keys in a root node positioned at the top level;
node key generation means for generating a value of a one-way function which has been executed the number of predetermined times depending on the execution rules for M keys (M£N) among the N initial keys in each node, as the M node keys for the node; and
a key delivery means for delivering a node key from each of the nodes to a descendant node.

42. A computer-readable storage medium storing a computer program in a key information processing method for generating a key at each node from a parent node according to a hierarchical relationship expressed in a directed graph having no cycle, the program causing a computer to execute the key information processing method, the method comprising:
an initial key generating step of calculating N keys in a root node positioned as a most significant node;
a node key generating step of generating a value of a one-way function is executed a number of predetermined times depending on execution rules for M keys (M£N) among N initial keys in each node, as M node keys for the node; and
a key delivery step of delivering a node key from each of the nodes to a descendant node.

* * * * *